(12) United States Patent
Sugita

(10) Patent No.: US 11,868,277 B2
(45) Date of Patent: *Jan. 9, 2024

(54) DATA PROCESSING APPARATUS AND MEMORY PROTECTION METHOD

(71) Applicant: RENESAS ELECTRONICS CORPORATION, Tokyo (JP)

(72) Inventor: Yasuhiro Sugita, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 17/559,113

(22) Filed: Dec. 22, 2021

(65) Prior Publication Data

US 2022/0114109 A1   Apr. 14, 2022

Related U.S. Application Data

(63) Continuation of application No. 16/411,492, filed on May 14, 2019, now Pat. No. 11,237,987.

(30) Foreign Application Priority Data

Jun. 18, 2018   (JP) .................................. 2018-115176

(51) Int. Cl.
   *G06F 12/14*     (2006.01)
   *G06F 12/0866*   (2016.01)

(52) U.S. Cl.
   CPC ........ *G06F 12/145* (2013.01); *G06F 12/0866* (2013.01); *G06F 12/1458* (2013.01); *G06F 2212/152* (2013.01)

(58) Field of Classification Search
   CPC ............... G06F 12/145; G06F 12/0866; G06F 12/1458; G06F 2212/1052
   See application file for complete search history.

(56) References Cited

U.S. PATENT DOCUMENTS 9,940,268 B2   4/2018   Craske et al.
2008/0244206 A1  10/2008   Heo et al.
(Continued)

FOREIGN PATENT DOCUMENTS

JP   2011-222055 A   11/2011
JP   2016-509303 A    3/2016
WO   2014/122414 A1   8/2014

OTHER PUBLICATIONS

Japanese Notice of Reasons for Refusal issued in corresponding Japanese Patent Application No. 2018-115176, dated Aug. 17, 2021, with English translation.

(Continued)

*Primary Examiner* — Tracy A Warren
(74) *Attorney, Agent, or Firm* — Rimon, P.C.

(57) ABSTRACT

The data processing apparatus includes a memory protection setting storage unit capable of storing a plurality of address sections as memory protection setting targets, a plurality of first determination units provided for each of the address sections stored in the memory protection setting storage unit and provisionally determining whether or not an access request is permitted based on whether or not an access destination address specified by the access request corresponds to the address section acquired from the memory protection setting storage unit, and a second determination unit finally determining whether or not the access request is permitted based on the classification information and the results of provisional determinations by the first determination unit.

7 Claims, 16 Drawing Sheets

(56) References Cited

U.S. PATENT DOCUMENTS

| | | |
|---|---|---|
| 2013/0297901 A1 | 11/2013 | Nakada et al. |
| 2014/0108701 A1 | 4/2014 | Liljeberg |
| 2016/0364342 A1 | 12/2016 | Piel et al. |
| 2017/0091125 A1 | 3/2017 | Adachi et al. |
| 2018/0113816 A1 | 4/2018 | Hellwig et al. |

OTHER PUBLICATIONS

Extended European Search Report issued in European Patent Application No. 19176109.7-1221, dated Nov. 13, 2019.
U.S. PTO Non-Final Office Action issued in related parent U.S. Appl. No. 16/411,492, dated Jun. 9, 2020.
U.S. PTO Final Office Action issued in related parent U.S. Appl. No. 16/411,492, dated Oct. 15, 2020.
U.S. PTO Non-Final Office Action issued in related parent U.S. Appl. No. 16/411,492, dated Apr. 27, 2021.
U.S. PTO Notice of Allowance issued in related parent U.S. Appl. No. 16/411,492, dated Sep. 24, 2021.
Parent U.S. Appl. No. 16/411,492, filed May 14, 2019.

FIG. 13

| HOST VIOLATION INFORMATION | GUEST VIOLATION INFORMATION | VIOLATION INFORMATION |
|---|---|---|
| 0 | 0 | NO HOLD OF VIOLATION INFORMATION |
| 0 | 1 | GUEST VIOLATION |
| 1 | 0 | HOST VIOLATION |
| 1 | 1 | GUEST VIOLATION |

FIG. 14

| HOST VIOLATION INFORMATION | GUEST VIOLATION INFORMATION | EXCEPTION GENERATION MACHINE |
|---|---|---|
| 0 | 0 | NO EXCEPTION OCCURES |
| 0 | 1 | VM |
| 1 | 0 | VMM |
| 1 | 1 | VM |

SWITCHING BY VIRTUAL MACHINE MONITOR

▦ : GUEST MANAGEMENT ENTRY
▨ : HOST MANAGEMENT ENTRY

SWITCHING BY VIRTUAL MACHINE
(NORMAL ENTRY SPECIFICATION)

▦ : GUEST MANAGEMENT ENTRY
▨ : HOST MANAGEMENT ENTRY

DATA PROCESSING APPARATUS AND MEMORY PROTECTION METHOD

CROSS-REFERENCE TO RELATED APPLICATIONS

This is a Continuation of U.S. patent application Ser. No. 16/411,492, filed on May 14, 2019, which claims the benefit of Japanese Patent Application No. 2018-115176 filed on Jun. 18, 2018 including the specification, drawings and abstract is incorporated herein by reference in its entirety.

BACKGROUND

The present invention relates to a data processing apparatus and a memory protection method, and can be suitably used, for example, in a data processing apparatus in which a virtual machine operates.

A virtualization technique is known as a technique for constructing a virtual machine (Virtual Machine) on a physical machine. In this virtualization technique, a virtual machine operates on a management software called a virtual machine monitor (Virtual Machine Monitor). In a data processing apparatus incorporating virtualization techniques, there may be two types of memory protection. One is a memory protection set by the virtual machine monitor. The other is a memory-protection that is set by a virtual machine, and more particularly, by programs (e.g., an operating system (Operating System)) that are executed on the virtual machine.

In this regard, Japanese Patent Application No. 2016-509303 discloses a microprocessor core having a first MPU (Memory Protection Unit) and a second MPU.

SUMMARY

In the microprocessor core described in Japanese Patent Application No. 2016-509303, when the above-mentioned two types of memory protection are realized, the virtual machine uses the first MPU and the virtual machine monitor uses the second MPU. Here, the number of entries used in the first MPU and the number of entries used in the second MPU both depend on the virtual machine to be operated. That is, for example, when various virtual machines operate sequentially in a time division manner on one physical machine, the number of entries used in the first MPU and the number of entries used in the second MPU change depending on which virtual machine is operating. Therefore, it is necessary to statically set the maximum number of entries used in the first MPU by each virtual machine that is supposed to operate on the physical machine as the number of entries of the first MPU at the time of manufacturing the physical machine. Similarly, it is necessary to statically set the number of entries of the second MPU at the time of manufacturing the physical machine in consideration of each virtual machine which is supposed to operate on the physical machine. In other words, the number of entries of the first MPU and the number of entries of the second MPU must both be the maximum number to be used. This leads to an increase in the circuit scale.

According to one embodiment, the data processing apparatus includes a memory protection setting storage unit capable of storing a plurality of address sections, a plurality of first determination units which provisionally determines whether or not an access request is permitted, classification information which determines whether or not each address section stored in the memory protection setting storage unit is for a memory protection set by a virtual machine monitor or for a memory protection set by a virtual machine, and a second determination unit which finally determines whether or not the access request is permitted based on a result of each provisional determination by each of the first determination units.

According to the above embodiment, the memory protection function set by the virtual machine monitor and the memory protection function set by the virtual machine can be realized while suppressing an increase in the circuit scale.

BRIEF DESCRIPTION OF THE DRAWINGS

FIG. 13 is a table showing an example of a relationship between host violation information and guest violation information received by the processing circuit and violation information maintained by the processing circuit.

FIG. 14 is a table illustrating an example of a relationship between host violation information and guest violation information received by a processing circuit and a machine that generates an exception.

DETAILED DESCRIPTION

Figure 1:
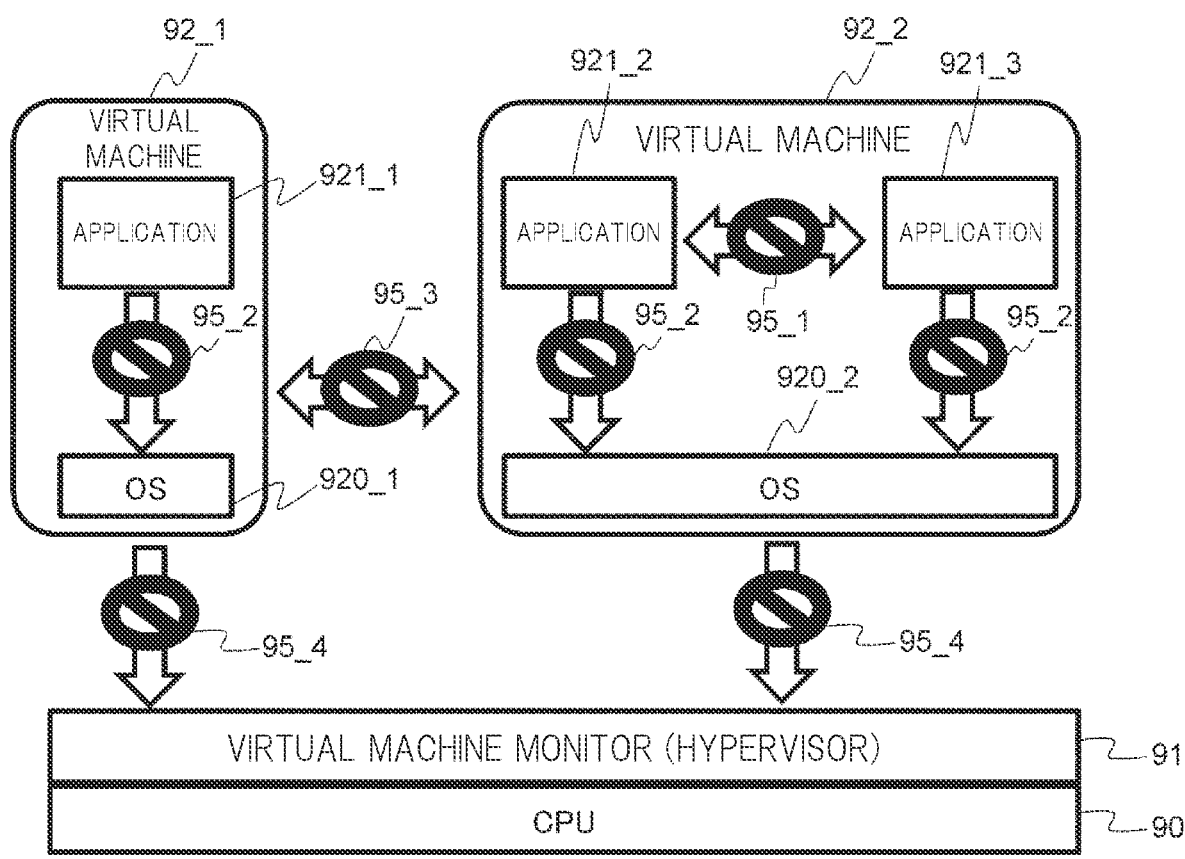
FIG. 1 is a schematic diagram showing two types of memory protection in a data processing apparatus incorporating a virtualization technique.

For clarity of explanation, the following description and drawings are appropriately omitted and simplified. In the drawings, the same elements are denoted by the same reference numerals, and a repetitive description thereof is omitted as necessary.

Before the description of the embodiment, first, the matters considered by the inventor up to the embodiment will be described.

FIG. 1 is a schematic diagram showing two types of memory protection in a data processing apparatus incorporating a virtualization technique. In the virtualization technique, as shown in FIG. 1, a virtual machine monitor 91, also referred to as a Hypervisor, operates on a physical machine such as a CPU (Central Processing Unit) 90. For example, the virtual machines 92_1 and 92_2 are realized on the virtual machine monitor 91. In each virtual machine, an OS and application software are installed. In some cases, the OS is not installed, and only the application software is installed. In the example shown in FIG. 1, the OS 920_1 and the application software 921_1 are executed in the virtual machine 92_1, and the OS 920_2 and the application software 921_2 and 921_3 are executed in the virtual machine 92_2.

In a data processing apparatus incorporating such the virtualization technique, there may be a memory protection set by a virtual machine (the virtual machine 92_1 or the virtual machine 92_2) and a memory protection set by the virtual machine monitor 91. In FIG. 1, memory protection 95_1 and memory protection 95_2 are the memory protections set by the virtual machine. The memory protection 95_1 is memory protection for preventing interference between application software in the virtual machine, and the memory protection 95_2 is memory protection for preventing interference from the application software to the OS. In FIG. 1, memory protection 95_3 and memory protection 95_4 are memory protections set by the virtual machine monitor. The memory protection 95_3 is memory protection for preventing interference between virtual machines, and the memory protection 95_4 is memory protection for preventing interference from the virtual machine to the virtual machine monitor.

Figure 2:
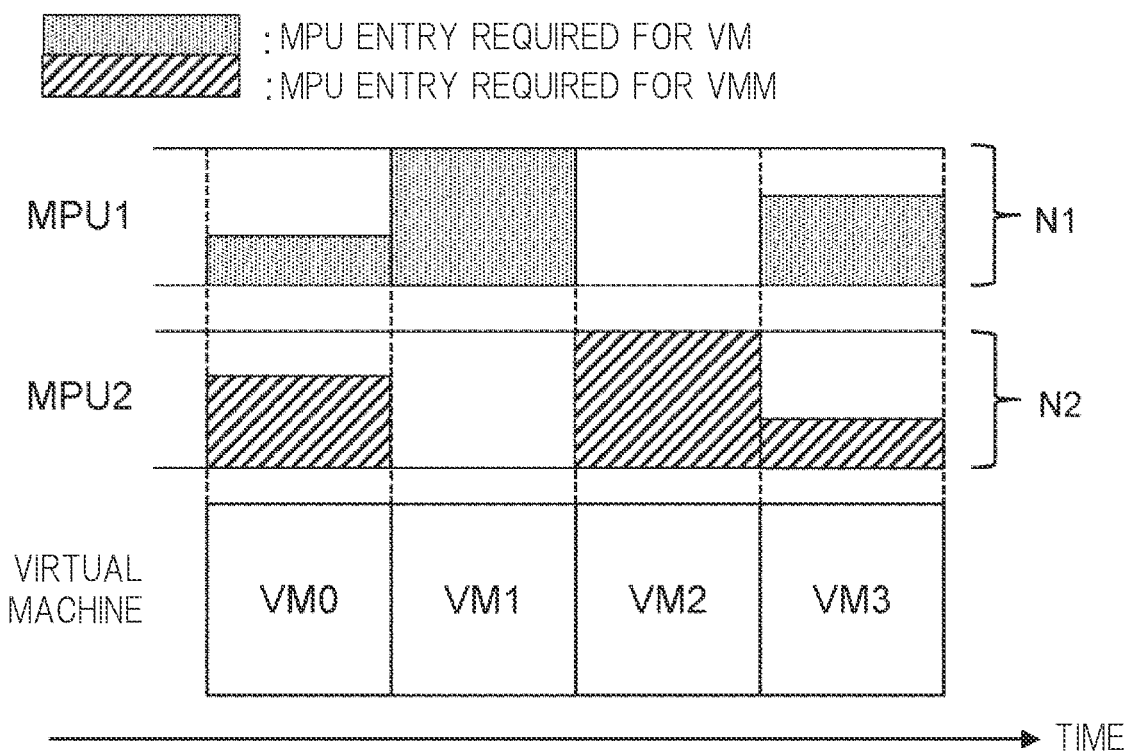
FIG. 2 is a schematic diagram showing the number of entries of each MPU when two types of memory protection are realized using two MPUs.

FIG. 2 is a schematic diagram showing the number of entries of each MPU when the above-described two types of memory protection are realized using two MPUs. In FIG. 2, the first MPU (MPU1 in FIG. 2) is the MPU used for the memory protection function by the virtual machine, and the second MPU (MPU2 in FIG. 2) is the MPU used for the memory protection function by the virtual machine monitor. In the embodiment shown in FIG. 2, four types of virtual machines, i.e., a VM0, a VM1, a VM2, and a VM3, operate in this order.

Here, in particular, at the time of operation of the VM1, memory protection by the virtual machine is sufficiently realized only by the memory protection by the virtual machine, so that memory protection by the virtual machine monitor is not required. For this reason, while many entries are required in the MPU1 when the VM1 operates, the number of entries required in the MPU2 is 0. This case is occurred, for example, when an operating system providing a memory-protecting function which can be said to be highly reliable for the virtual machine monitor is executed on a VM1. In addition, since there is no memory protection by the virtual machine during the operation of the VM2, only the virtual machine monitor must perform the memory protection. Thus, during operation of the VM2, the number of entries required in the MPU1 is zero, but the number of entries required in the MPU2 is large. This case is occurred, for example, when control software or the like having no memory-protecting function is executed on the VM2.

As shown in FIG. 2, the number of entries required by the MPU1 and the number of entries required by the MPU2 are not constant. Here, it is assumed that the number of entries required in the MPU1 is N1 when the VM1 operates, and the number of entries required in the MPU2 is N2 when the VM2 operates. As shown in FIG. 2, when the number of entries of the MPU1 is designed to be N1, there are surplus entries when a virtual machine other than the VM1 operates. Similarly, when the number of entries of the MPU2 is designed to be N2, there are surplus entries when a virtual machine other than the VM2 operates.

Figure 3:
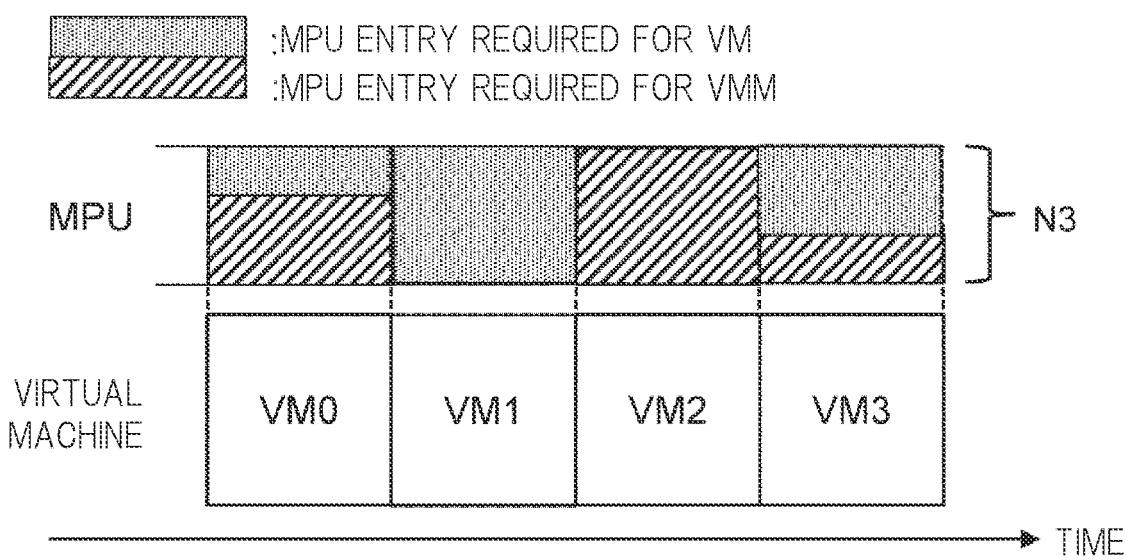
FIG. 3 is a schematic diagram showing the number of entries when two types of memory protection are realized using one MPU.

On the other hand, FIG. 3 is a schematic diagram showing the number of entries when two types of memory protection are realized by using one MPU. As shown in FIG. 3, an efficient configuration can be realized by using an entry used for either the memory protection function by the virtual machine or the memory protection function by the virtual machine monitor at a certain time, and also used for the other memory protection function at another time. In this case, for example, the number of entries to be provided in the MPU can be N3 which is smaller than the sum of N1 and N2. In the embodiment described below, a technique for realizing such dynamic entry setting will be described.

Figure 4:
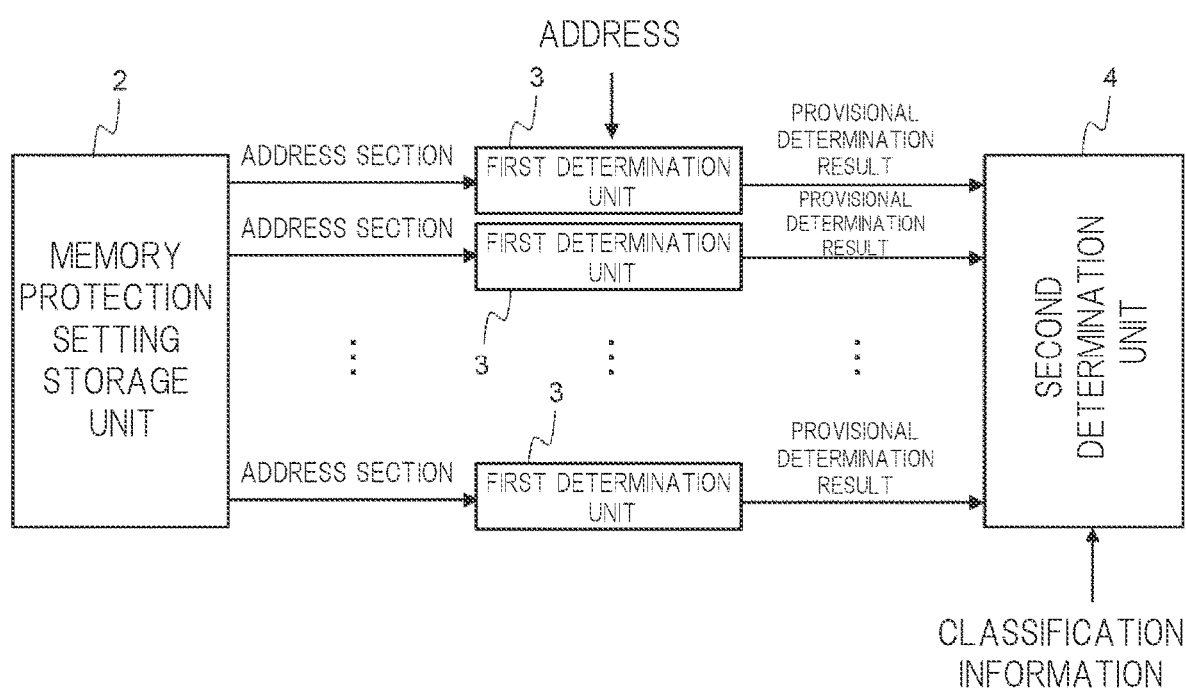
FIG. 4 is a block diagram showing an example of a configuration of a data processing apparatus according to an outline of an embodiment.

Prior to the detailed description of the embodiment, the outline of the embodiment will be described. FIG. 4 is a block diagram showing an example of the configuration of the data processing apparatus 1 according to the outline of the embodiment. As shown in FIG. 4, the data processing apparatus 1 includes a memory protection setting storage unit 2, a first determination unit 3, and a second determination unit 4.

The memory protection setting storage unit 2 is a storage unit capable of storing a plurality of address sections for which memory protection is to be set. Here, the address section stored in the memory protection setting storage unit 2 may be an address section in which access can be permitted or an address section in which access is prohibited. For example, when access to the memory is prohibited by default, that is, when access is prohibited in principle, memory protection is realized by setting an address section in which access can be permitted. In such a case, the address section stored in the memory protection setting storage unit 2 is an address section in which access can be permitted. Similarly, when access to the memory is permitted by default, that is, when access is permitted in principle, memory protection is realized by setting an address section in which access is prohibited. In such a case, the address section stored in the memory protection setting storage unit 2 is an address section in which access is prohibited.

The memory protection setting storage unit 2 includes, for example, a plurality of storage areas (a plurality of registers) and stores an address section in each storage area. Each storage area corresponds to the above-mentioned entry. In the memory protection setting storage unit 2, each entry may be used for memory protection by the virtual machine monitor or may be used for memory protection by the virtual machine. That is, an address section may be set for each entry by the virtual machine monitor, or an address section may be set by the virtual machine. Which memory protection each entry is used for is defined by classification information described later. The memory protection setting storage unit 2 does not need to have classification information.

A plurality of the first determination units 3 are provided. Specifically, the first determination unit 3 is provided for each address section stored in the memory protection setting storage unit 2. The first determination unit 3 tentatively determines whether or not an access request is permitted based on whether or not a destination address specified by the access request corresponds to the address section acquired from the memory protection setting storage unit 2. Each of the first determination units 3 outputs a provisional determination result to the second determination unit.

The second determination unit 4 finally determines whether or not access is permitted based on the classification information and the provisional determination results by the first determination unit 3. Here, the classification information is information for determining whether each address section stored in the memory protection setting storage unit 2 is for memory protection set by the virtual machine monitor or for memory protection set by the virtual machine.

As described above, in the data processing apparatus 1, it is possible to specify which one of the two types of memory protection the address section stored in the memory protection setting storage unit 2 is for, based on the classification information. Therefore, the second determination unit 4 can specify whether the provisional determination result by the first determination unit 3 should be recognized as a provisional determination result for memory protection by the virtual machine monitor or as a provisional determination result for memory protection by the virtual machine. Therefore, in the memory protection setting storage unit 2, even if an entry for a virtual machine monitor and an entry for a virtual machine are mixed, two types of memory protection can be appropriately realized. The number of entries for the virtual machine monitor and the number of entries for the virtual machine in the memory protection setting storage unit 2 can be dynamically changed by the classification information. That is, according to the data processing apparatus 1, it is possible to flexibly change the ratio of the entry for the virtual machine monitor and the entry for the virtual machine in the memory protection setting storage unit 2. Therefore, according to the data processing apparatus 1, the memory protection function set by the virtual machine monitor and the memory protection function set by the virtual machine can be realized while suppressing an increase in the circuit scale.

As described above, the memory protection setting storage unit 2 does not need to store the classification information. That is, the setting content of the entry to be set by the virtual machine and the virtual machine monitor does not depend on whether or not the memory protection by the above-described configuration is performed. Therefore, it is possible to suppress the influence on the existing technology in adopting the above-described configuration.

The memory protection setting storage unit 2 may further store attribute information, which is information about an access attribute, in association with an address section. Here, the attribute information may be, for example, information indicating which access type (e.g., read access, write access, execution access, etc.) the protection setting is for. Further, the attribute information may be, for example, information indicating which access authority (e.g., access in a user mode, access in a privileged mode, etc.) the protection setting is used for. Also, the attribute information may be information indicating which access source the protection setting is for. In this case, the first determination unit 3 temporarily determines whether or not an access request is permitted based on whether or not the address area of the access destination specified by the access request corresponds to the address section acquired from the memory protection setting storage unit 2, and whether or not the attribute of the access request matches the attribute information acquired from the memory protection setting storage unit 2. With such a configuration, more detailed memory protection can be realized.

First Embodiment

Figure 5:
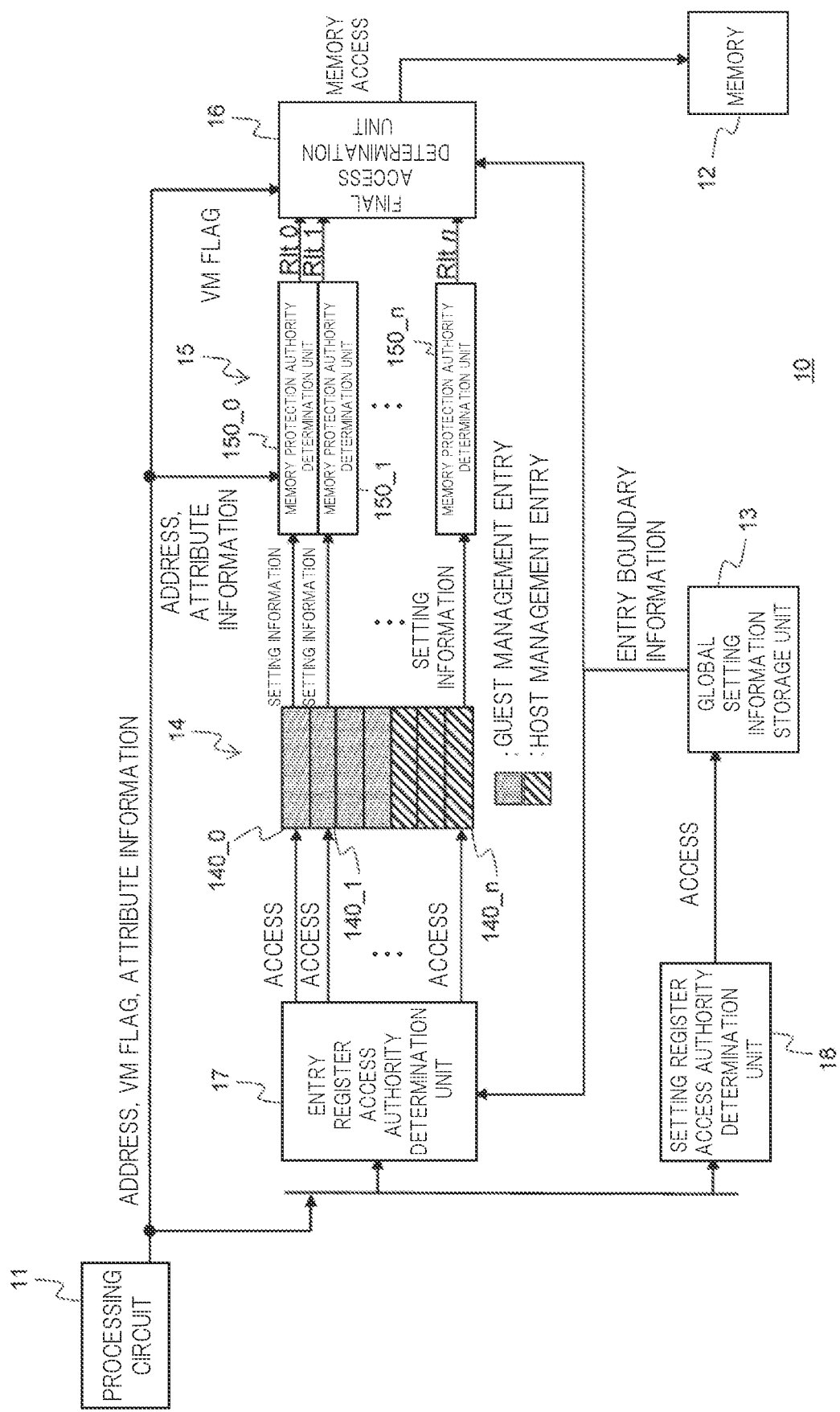
FIG. 5 is a block diagram showing an example of a configuration of a data processing apparatus according to a first embodiment.

Next, a detailed explanation of the embodiment is described. FIG. 5 is a block diagram showing an example of the configuration of the data processing apparatus 10 according to the first embodiment. As shown in FIG. 5, the data processing apparatus 10 includes a processing circuit 11, a memory 12, a global setting information storage unit 13, an MPU entry unit 14, a temporary access determination unit 15, a final access determination unit 16, an entry register access authority determination unit 17, and a setting register access authority determination unit 18.

The processing circuit 11 is a circuit that executes various types of processing by executing a program, and specifically is a processor such as a CPU. The memory 12 is, for example, a volatile memory or a nonvolatile memory, and stores a program executed by the processing circuit 11, data used for processing of the processing circuit 11, and the like. The programs executed by the processing circuit 11 include, for example, various programs such as a virtual machine monitor and a virtual machine. In the present embodiment, memory protection setting by the virtual machine monitor or the memory protection setting by the virtual machine based on the information set in the MPU entry unit 14 and the entry boundary information obtained from the global setting information storage unit 13 is realized for the memory 12.

The global setting information storage unit 13 is a register for storing entry boundary information. The global setting information storage unit 13 stores entry boundary information, which is information corresponding to the above-described classification information, and therefore is also referred to as a classification information storage unit. Details of the entry boundary information will be described later. In addition to the entry boundary information, the global setting information storage unit 13 may store other comprehensive setting information for memory protection.

The MPU entry unit 14 corresponds to the memory protection setting storage unit 2 of FIG. 4, and includes a total of n+1 entries from the entry 140_0 to the entry 140_n. That is, the MPU entry unit 14 is composed of, for example, n+1 registers. Setting information of the memory protection function is stored in each entry. Therefore, the MPU entry unit 14 can store setting information of n+1 types of memory protection functions. The setting information is set in the MPU entry unit 14 by the virtual machine monitor or the virtual machine.

The setting information of the memory protection function set by the virtual machine monitor is required to be used for memory protection by the virtual machine monitor, and the setting information of the memory protection function set by the virtual machine is required to be used for memory protection by the virtual machine. Therefore, it is necessary to specify which of the setting information stored in the MPU entry unit 14 is the setting information set by the virtual machine monitor and which is the setting information set by the virtual machine. In the present embodiment, the entry boundary information is used for the specification. The entry boundary information corresponds to the above-described classification information. The entry boundary information is information defining which entry among the entries 140_0 to 140_$n$ is an entry for a virtual machine and which entry is an entry for a virtual machine monitor. In the following description, an entry for a virtual machine is referred to as a guest management entry, and an entry for a virtual machine monitor is referred to as a host management entry. Further, the entry 140_0, the entry 140_1, . . . , and the entry 140_$n$ are referred to as the entry 140 when they are referred to without any particular distinction.

In FIG. 5, in order to facilitate understanding, the MPU entry unit 14 is distinguished by hatching the guest management entry and the host management entry with different patterns. However, it is not necessary for the MPU entry unit 14 to distinguish whether each entry 140 is a guest management entry or a host management entry. That is, it is not necessary to set in the MPU entry unit 14 whether each entry 140 is a guest management entry or a host management entry. This is because it is distinguishable by the entry boundary information.

Figure 6:
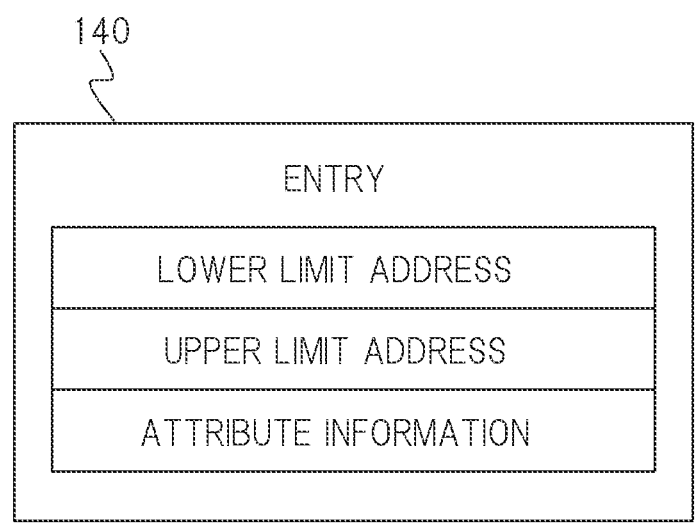
FIG. 6 is a schematic diagram showing an example of information stored in each entry in an MPU entry block.

FIG. 6 is a schematic diagram showing an example of information stored in each entry 140 of the MPU entry unit 14. As shown in FIG. 6, in this embodiment, a lower limit address and an upper limit address defining an address section are stored in each entry 140. Also, each entry 140 stores attribute information, which is information about an access attribute, in association with a lower limit address and an upper limit address. In the present embodiment, it is assumed that access to the memory 12 is prohibited by default. Therefore, each entry 140 stores a lower limit address and an upper limit address that define an address section to which access can be permitted. Further, in the present embodiment, as the attribute information, information indicating which access source sets protection against access is stored in each entry 140. Specifically, each entry 140 stores identifier information for identifying which program (virtual machine) sets the protection against access. In the following explanation, this identifier information is referred to as MPID. The stored attribute information may be other information such as an access type and a mode type (e.g., a user mode, a privileged mode, etc.). In addition, a plurality of pieces of attribute information may be stored.

The setting information of each entry 140 is referred to by the temporary access determination unit 15. The temporary access determination unit 15 includes a memory protection authority determination unit 150_0, a memory protection authority determination unit 150_1, . . . , and a memory protection authority determination unit 150_$n$. In the following description, the memory protection authority determination unit 150_0, the memory protection authority determination unit 150_1, . . . , and the memory protection authority determination unit 150_$n$ are referred to as the memory protection authority determination unit 150 when they are referred to without particular distinction.

The memory protection authority determination unit 150 corresponds to the first determination unit 3 in FIG. 4, and is a circuit that makes a provisional determination as to whether or not access is possible based on the setting information stored in the MPU entry unit 14. The memory protection authority determination unit 150 is provided corresponding to each entry 140 of the MPU entry unit 14.

When there is an access request from the processing circuit 11, each memory protection authority determination unit 150 performs provisional determination based on the setting information acquired from the MPU entry unit 14, and outputs the provisional determination result to the final access determination unit 16. That is, when there is an access request from the processing circuit 11, the memory protection authority determination unit 150_0 performs temporary determination based on the setting information acquired from the entry 140_0. Similarly, the memory protection authority determination unit 150_$i$ performs a provisional determination based on the setting information acquired from the entry 140_$i$. Where $i$ is an integer greater than or equal to 0 and less than or equal to n. Therefore, when there is an access request from the processing circuit 11, n+1 temporary determination results output from each memory protection authority determination unit 150 are output to the final access determination unit 16. The provisional determination result by the memory-protection-authority determination unit 150_0 is represented as Rlt0. Similarly, the provisional determination result by the memory protection authority determination unit 150_$i$ is represented as Rlt $i$. Where $i$ is an integer greater than or equal to 0 and less than or equal to n.

When accessing the memory 12, the processing circuit 11 outputs an access address, a VM flag, and attribute information. As described above, in the present embodiment, the attribute information is MPID. The VM flag is information indicating whether the access is by the virtual machine monitor or by the virtual machine, for example, when the value is 0, it indicates that the access is by the virtual machine monitor, and when the value is 1, it indicates that the access is by the virtual machine. That is, the VM flag can also be referred to as access source information indicating whether or not the access requested by the access request is an access by the virtual machine monitor. The VM flag is used by the final access determination unit 16, which will be described later, to control the access determination depending on whether or not the access source is the virtual machine monitor. In the present embodiment, control using the VM flag is performed in the final access determination unit 16, but when control is performed without using the VM flag in the final access determination unit 16, the processing circuit 11 may not output the VM flag or the final access determination unit 16 may not receive the VM flag. The access information output from the processing circuit 11 in response to the access request from the processing circuit 11 may include other information such as an access type and an access size.

When an access is requested by the processor 11, an access addresses and an attribute information (MPID) are inputted to the memory protection authority determination unit 150. Each memory protection authority determination unit 150 compares the information (lower limit address, upper limit address, and attribute information) acquired from the MPU entry unit 14 with the information (the access address and the attribute information) input from the processing circuit 11, thereby making a provisional determination as to whether or not the access is permitted.

Figure 7:
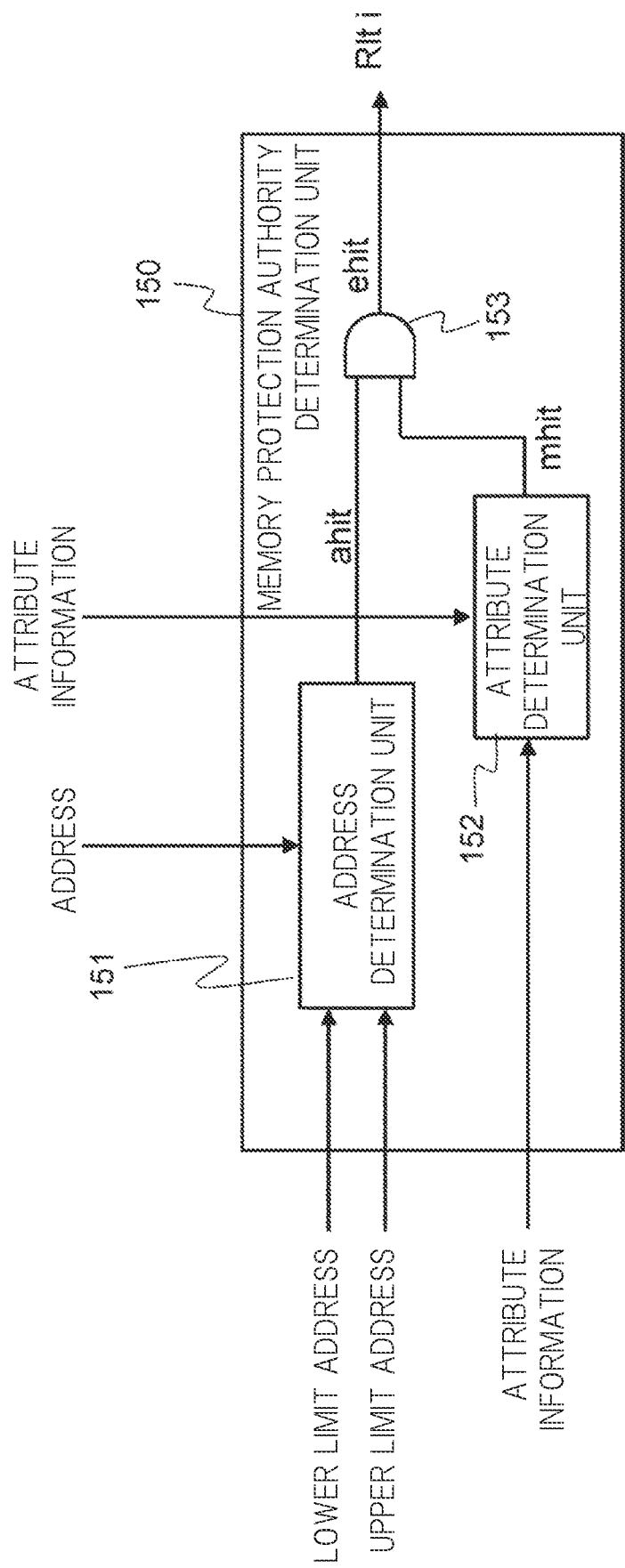
FIG. 7 is a block diagram illustrating an example of a configuration of a memory protection authority determination unit.

FIG. 7 is a block diagram showing an example of the configuration of the memory protection authority determination unit 150. As shown in FIG. 7, each memory protection authority determination unit 150 includes an address determination unit 151, an attribute determination unit 152, and an AND circuit 153.

The lower limit address and the upper limit address from the MPU entry unit 14 and the access address from the processing circuit 11 are input to the address determination unit 151. The access address is, for example, an address area determined by an address and an access size. The address determination unit 151 is a circuit that determines whether or not the access address matches a condition defined based on the lower limit address and the upper limit address, for example, lower limit address≤access address≤upper limit address. The address determination unit 151 outputs a determination result signal "ahit". The address determination unit 151 outputs 1 as the determination result signal "ahit" when the inputted access address satisfies the condition, and outputs 0 as the determination result signal "ahit" when the inputted access address does not satisfy the condition. The determination result signals "ahit" are inputted to the AND circuits 153.

Attribute information from the MPU entry unit 14 and attribute information from the processing circuit 11 are input to the attribute determination unit 152. The attribute determination unit 152 is a circuit that determines whether the attribute information input from the processing circuit 11 matches a condition defined based on the attribute information input from the MPU entry unit 14 (for example, "attribute information input from the processing circuit 11 ="attribute information input from the MPU entry unit 14")). In the present embodiment, the attribute determination unit 152 determines whether or not the MPID input from the processor 11 satisfies the condition based on the MPID input from the MPU entry unit 14, but the determination target is not limited to MPID. That is, the determination of other attribute information such as the access type may be performed. The property determination unit 152 outputs the determination result signal "mhit". The attribute determination unit 152 outputs 1 as the determination result signal "mhit" when the attribute information inputted from the processor 11 satisfies the condition, and outputs 0 as the determination result signal "mhit" when the condition is not satisfied. The determination result signal "mhit" is inputted to the AND circuits 153. In the MPID determination, it may be determined whether the MPID from the processor 11 matches any of a plurality of MPIDs stored in the MPU entry unit 14.

A determination result signal "ahit" and a determination result signal "mhit" are inputted to the AND circuit 153. The AND circuit 153 calculates the AND of these input signals and outputs a determination result signal "ehit". The determination result signal "ehit" is a signal indicating whether or not the access request from the processor 11 satisfies the condition defined by the setting information in the MPU entry unit 14. When the access request from the processor 11 satisfies the condition defined by the setting information in the MPU entry unit 14, that is, when the access request satisfies the condition in the address determination unit 151 and the access request satisfies the condition in the attribute determination unit 152, the determination result signal "ehit" becomes 1. Otherwise, the determination result signal "ehit" becomes 0. The determination result signal "ehit" is outputted to the final access determination unit 16 as the provisional determination result signal Rlt i.

In the present embodiment, the memory protection authority determination unit 150 determines the address and the attribute information, but only the address may be determined. In this case, attribute information may not be stored in the MPU entry unit 14.

Next, the final access determination unit 16 will be described. The n+1 temporary determination results output from each memory protection authority determination unit 150 are input to the final access determination unit 16. The VM flag is input from the processing circuit 11 to the final access determination unit 16. The entry boundary information is input from the global setting information storage unit 13 to the final access determination unit 16.

In the present embodiment, the entry boundary information indicates to which entries among the entries 140 of the MPU entry unit 14 is the guest management entry. That is, the entry boundary information indicates the entry number of the series of entries 140 of the MPU entry unit 14 to be switched to the host management entry, that is, the minimum value of the entry number of the host management entry. For example, when the value of the entry boundary information is 0, it means that all the entries 140 of the MPU entry unit 14 are host management entries. When the entry boundary information is n+1, it means that all the entries 140 of the MPU entry unit 14 are guest management entries.

Figure 8:
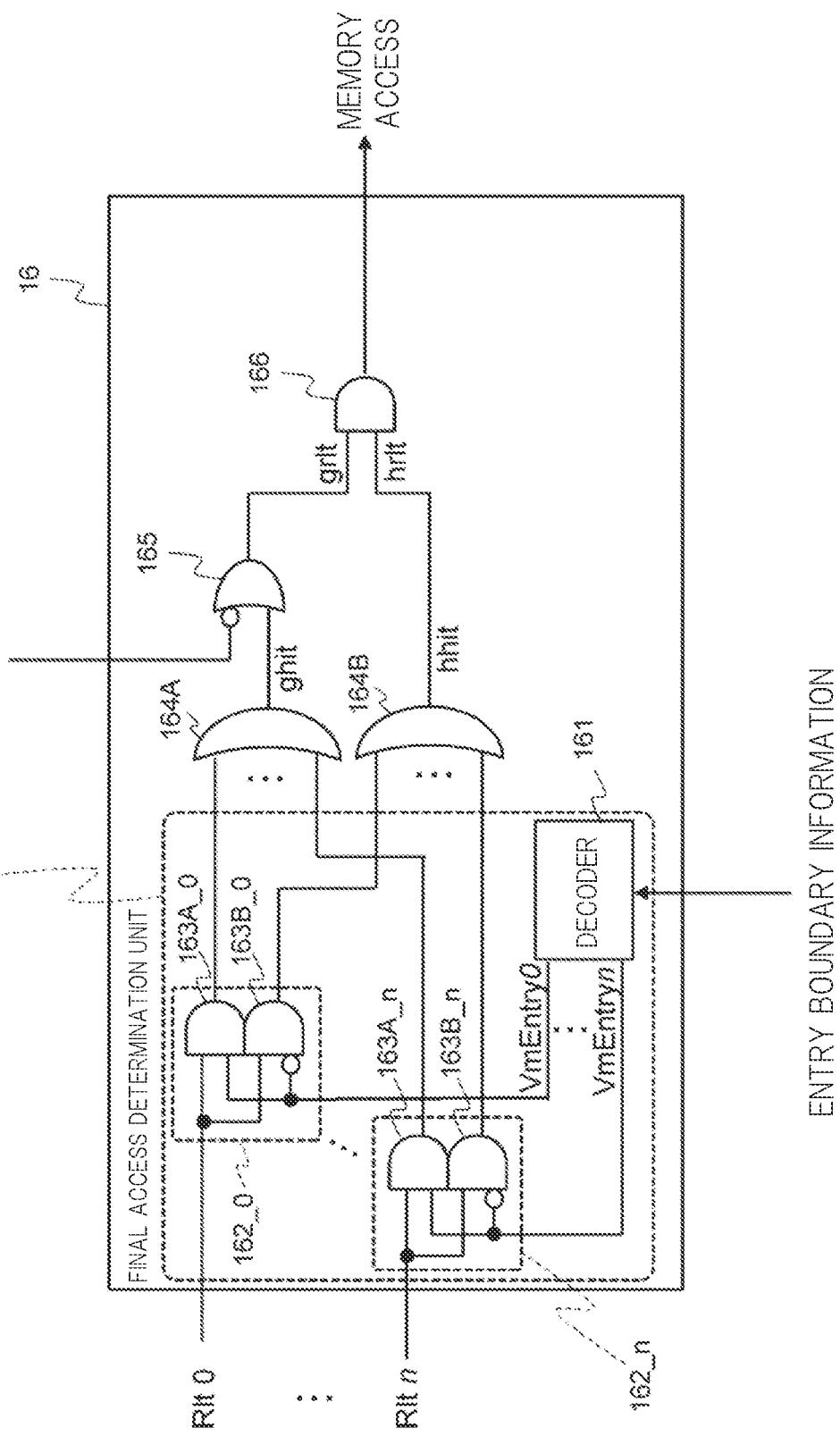
FIG. 8 is a block diagram illustrating an example of a configuration of a final access determining unit according to the first embodiment.

FIG. 8 is a block diagram showing an example of the configuration of the final access determination unit 16. As shown in FIG. 8, the final access determination unit 16 includes a sorting unit 160, OR circuits 164A, 164B, and 165, and an AND circuit 166.

The sorting unit 160 is a circuit that sorts the n+1 temporary determination results output from each memory protection authority determination unit 150 into a temporary determination result corresponding to a guest management entry and a temporary determination result corresponding to a host management entry. In other words, the sorting unit 160 sorts the provisional determination result output from each memory protection authority determination unit 150 into a provisional determination result determined according to the memory protection condition set by the virtual machine and a provisional determination result determined according to the memory protection condition set by the virtual machine monitor.

Specifically, the sorting unit 160 includes a decoder 161 and n+1 separation circuits 162_0, . . . , 162_n.

The decoder 161 converts the entry boundary information inputted from the global setting information storage unit 13 into n+1 pieces of label information, VmEntry0 to VmEntryn. Here, VmEntry i is label information corresponding to the temporary determination result Rlt i by the memory protection authority determination unit 150_i. Where i is an integer greater than or equal to 0 and less than or equal to n. The label information is information that specifies whether each of the temporary determination results output from each memory protection authority determination unit 150 is a temporary determination result corresponding to a guest management entry or a temporary determination result corresponding to a host management entry. The decoder 161 generates the following binary label information based on the entry boundary information. When the value of the entry boundary information is i, the decoder 161 sets the value of VmEntry (i−1) from VmEntry0 to 1, and sets the value of VmEntryi to VmEntryn to 0. Therefore, when the value of the entry boundary information is 0, all the values from VmEntry0 to VmEntryn are 0, and when the value of the entry boundary information is n+1, all the values from VmEntry0 to VmEntryn are 1.

The separation circuit 162_i is connected to the memory protection authority determining unit 150_i, and receives the temporary determination result Rlt i. The separation circuit 162_i includes two AND circuits 163A_i and 163B_i. The temporary determination result Rlt i outputted from the memory protection authority determination unit 150_i is inputted to the AND circuits 163A_i and 163B_i. The AND circuits 163A_i and 163B_i also receive the label information VmEntry i outputted from the decoders 161. Note that signals obtained by inverting the label information VmEntry i outputted from the decoders 161 are inputted to the AND circuits 163B-i. The AND circuit 163A-i performs an AND operation on the provisional determination result Rlt i and the label-information VmEntry i, and outputs the operation result. The AND circuit 163B-i performs an AND operation of the provisional determination result Rlt i and the inverted signal of the label information VmEntry i, and outputs the operation result. The output of the AND circuit 163A_i is input to the OR circuit 164A. The output of the AND circuit 163B_i is input to the OR circuit 164B. Therefore, all the provisional determination results corresponding to the guest management entry and having a value of 1 are aggregated in the OR circuit 164A. Similarly, all the temporary determination results corresponding to the host management entry and having a value of 1 are aggregated in the OR circuit 164B.

The OR circuit 164A determines whether or not the access request from the processing circuit 11 satisfies the condition defined by the setting information of any guest management entry. The OR circuit 164A outputs the determination result signal "ghit". The OR circuit 164A outputs 1 as the determination result signal "ghi"t when the access request from the processing circuit 11 satisfies the condition defined by the setting information of any guest management entry, and outputs 0 as the determination result signal "ghit" when the access request does not satisfy any of the conditions defined by the setting information of the guest management entry. The determination result signals "ghit" are inputted to the OR circuits 165.

The OR circuit 164B determines whether or not the access request from the processing circuit 11 satisfies the condition defined by the setting information of any host management entry. The OR circuit 164B outputs the determination result signal "hhit". The OR circuit 164B outputs 1 as the determination result signal "hhit" when the access request from the processing circuit 11 satisfies the condition defined by the setting information of any host management entry, and outputs 0 as the determination result signal "hhit" when the access request does not satisfy any of the conditions defined by the setting information of the host management entry. The determination result signals "hhit" are inputted to the AND circuits 166.

The OR circuit 165 determines whether or not to adopt the provisional determination result corresponding to the guest management entry. The OR circuit 165 outputs a signal "grlt". The virtual machine operates under the management of a virtual machine monitor. Therefore, when the access source is a virtual machine monitor, it is preferable that the access is not restricted in accordance with the memory protection function set by the virtual machine. Therefore, in the present embodiment, when the access source is the virtual machine monitor, the provisional determination result corresponding to the guest management entry is forcibly converted to 1. The inverted signal of the VM flag and the determination result signal "ghit" are inputted to the OR gate 165. As a result, when the accessing source is the virtual machine monitor, that is, when the value of the VM flag is 0, the OR circuit 165 outputs 1 as the signal "grlt" regardless of the value of the determination result signal "ghit".

The AND circuit 166 finally determines whether or not an access to the memory 12 is permitted. The AND circuit 166 receives the signal "grlt" outputted from the OR circuit 165. Further, the determination result signal "hhit" outputted from the OR circuit 164B is inputted to the AND circuit 166 as a signal "hrlt". As is obvious from the above explanation, the signal "grlt" is a signal indicating the determination result of access permission based on the setting information of the guest management entry, and represents access permission by the signal value 1 and represents access prohibition by the signal value 0. Similarly, the signal "hrlt" is a signal indicating a determination result of access permission or non-access permission based on the setting information of the host management entry, and indicates access permission by the signal value 1 and access prohibition by the signal value 0.

The AND circuit 166 performs an AND operation of the inputted signal "grlt" and the signal "hrlt", and outputs the operation result as a final determination result of whether or not the memory 12 is accessible. When the operation result is 1, an access to the memory 12 is permitted. When the operation result is 0, the access to the memory 12 is prohibited.

As described above, in the final access determining unit 16, if the value of the VM flag is 0, the provisional determination result based on the setting information of the guest management entry is not used, and if the access is permitted by the determination based on the setting information of the host management entry (i.e., when the signal "hrlt"=1 is obtained), it is finally determined that the access is permissible. Upon the VM flag indicating 1, when the access is permitted based on the setting information of the guest management entry (i.e., when the signal "grlt" is 1), and is also permitted based on the setting information of the host management entry (i.e., when the signal "hrlt" is 1), it is finally determined that the access is permitted. When a read access is performed, the access request may be speculatively issued to the memory 12, and the result of the read access may not be used after the memory protection determination.

Next, the entry register access authority determination unit 17 and the setting register access authority determination unit 18 will be described. It is preferable to control writing to the MPU entry unit 14 so that the setting information of the host management entry of the MPU entry unit 14 is not rewritten in the guest mode. In addition, it is preferable to control writing to the global setting information storage unit 13 so that comprehensive information for memory protection, such as entry boundary information, is not rewritten in the guest mode. That is, it is required to restrict free writing by the virtual machine to the MPU entry unit 14 and the global setting information storage unit 13. The entry register access authority determination unit 17 and the setting register access authority determination unit 18 determine the authority of writing, and restrict free writing without authority. The guest mode is an operation mode of the data processing apparatus 10 when the virtual machine is operated. On the other hand, the operation mode of the data processing apparatus 10 when the virtual machine monitor is operated is referred to as a host mode. The data processing apparatus 10 realizes the operation of the virtual machine monitor and the virtual machine by switching between the host mode and the guest mode in a time-sharing manner.

The entry register access authority determination unit 17 is a circuit that determines the write authority and restricts free writing to the MPU entry unit 14. The entry register access authority determining unit 17, also referred to as a memory protection setting write control unit, controls the write to the storage area of the memory protection setting storage unit based on an address that specifies the write target in the storage area of the memory protection setting storage unit (MPU entry unit 14), the classification information (entry boundary information), and the write source information (VM flag) that indicates whether or not the write is made by the virtual machine monitor. According to such a configuration, secure writing to the memory protection setting storage unit (MPU entry unit 14) can be realized. Hereinafter, a specific configuration of the entry register access authority determination unit 17 will be described.

Figure 9:
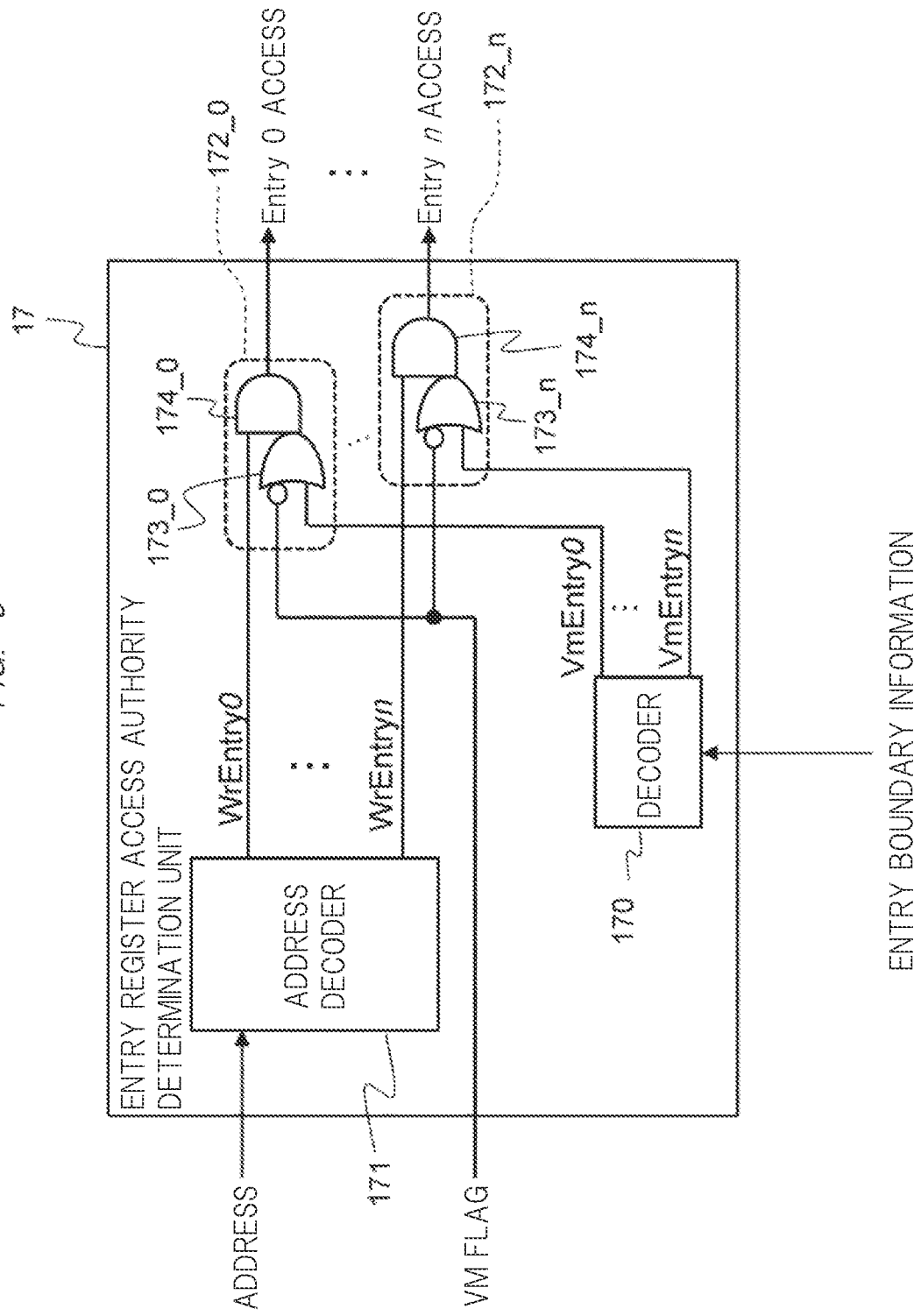
FIG. 9 is a block diagram illustrating an example of a configuration of an entry register access privilege determination unit.

FIG. 9 is a block diagram showing an example of the configuration of the entry register access authority determination unit 17. The entry register access authority determination unit 17 receives a write destination address and the VM flag from the processing circuit 11. The VM flag is information indicating whether the writing is by the virtual machine monitor or by the virtual machine, and when the value is 1, it indicates the writing access by the virtual machine, and when the value is 0, it indicates the writing access by the virtual machine monitor. The entry register access authority determination unit 17 receives entry boundary information from the global setting information storage unit 13.

As shown in FIG. 9, the entry register access authority determination unit 17 includes a decoder 170, an address decoder 171, and n+1 determination circuits 172_0, . . . , 172_n. In the following description, the determination circuits 172_0, . . . , 172_n are referred to as the determination circuit 172 when they are referred to without any particular distinction.

The decoder 170 is a circuit similar to the circuit of the decoder 161 in the final access determination unit 16, and converts the entry boundary information inputted from the global setting information storage unit 13 into n+1 pieces of label information, VmEntry0 to VmEntryn. The n+1 pieces of label information correspond one-to-one to the input of the n+1 pieces of determination circuits 172.

The address decoder 171 is a circuit for judging which entry 140 is accessed from the write destination address input from the processing circuit 11. For example, the address decoder 171 compares the address of each entry 140 in the MPU entry unit 14 with the address input from the processing circuit 11 to determine to which entry 140 the access requested by the write request is to be accessed. There are n+1 output signal lines corresponding to the respective entries 140. The address decoder 171 outputs 1 for the output signal line corresponding to the entry 140 which is the write destination, and outputs 0 for the output signal line corresponding to the entry 140 which is not the write destination. The n+1 output signal lines of the address decoder 171 correspond to the inputs of the n+1 determination circuits 172 on a one-to-one basis. It is assumed that a signal inputted to the determination circuit 172_i from the output signal line for the i-th entry 140 is WrEntry i. Where i is an integer greater than or equal to 0 and less than or equal to n.

The n+1 determination circuits 172 are provided in correspondence with the n+1 entries 140 of the MPU entry unit 14. The determination circuit 172_i corresponds to the i-th entry 140 of the MPU entry unit 14, and includes an OR circuit (OR circuit) 173_i and an AND circuit (AND circuit) 174_i.

The VM flag and the label information VmEntry i are inputted to the OR circuit 173_i. However, the inverted signal of the VM flag is input to the OR circuit 173_i. The OR circuit 173_i calculates the logical OR of the inverted signal of the VM flag and the label information VmEntry i, and outputs the logical OR of the inverted signal of the VM flag and the label information VmEntry i.

The AND circuit 174_i determines whether or not writing to the i-th entry 140 is permitted. The AND circuit 174_i receives the output of the OR circuit 173_i and the signal WrEntry i output from the address decoder 171. The AND circuit 174_i calculates the AND of the two input signals, and outputs the calculation result as the determination result of whether or not writing to the i-th entry 140 is permitted. When the operation result is 1, writing to the i-th entry 140 is permitted. When the operation result is 0, writing to the i-th entry 140 is prohibited.

According to the entry register access authority determination unit 17, when a write access to the i-th entry 140 occurs and the value of the VM flag is 0, that is, the access source is a virtual machine monitor, the write access to this entry 140 is permitted. When a write access to the i-th entry 140 occurs, and the value of the VM flag is 1 and the label-information VmEntry i indicates that this entry 140 is a guest management entry, the write access to this entry 140 is permitted. On the other hand, when a write access to the i-th entry 140 occurs, and the value of the VM flag is 1 and the label-information VmEntry i indicates that this entry 140 is a host management entry, the write access to this entry 140 is not permitted. That is, the writing is prohibited. That is, when the access source is a virtual machine, writing to only the guest management entry among the entries 140 of the MPU entry unit 14 is permitted, and writing to the host management entry is prohibited.

The setting register access authority determination unit 18 is a circuit that determines the write authority and restricts free writing to the global setting information storage unit 13. The setting register access authority determining unit 18 is also referred to as a classification information writing control unit and controls the writing to the storage area of the classification information storage unit (global setting information storage unit 13) based on the address specifying the writing target in the storage area of the classification information storage unit and the write source information (VM flag) indicating whether or not the writing is performed by the virtual machine monitor. According to such a configuration, it is possible to realize secure writing to the classification information storage unit 13. Hereinafter, a specific configuration of the setting register access authority determination unit 18 will be described.

Figure 10:
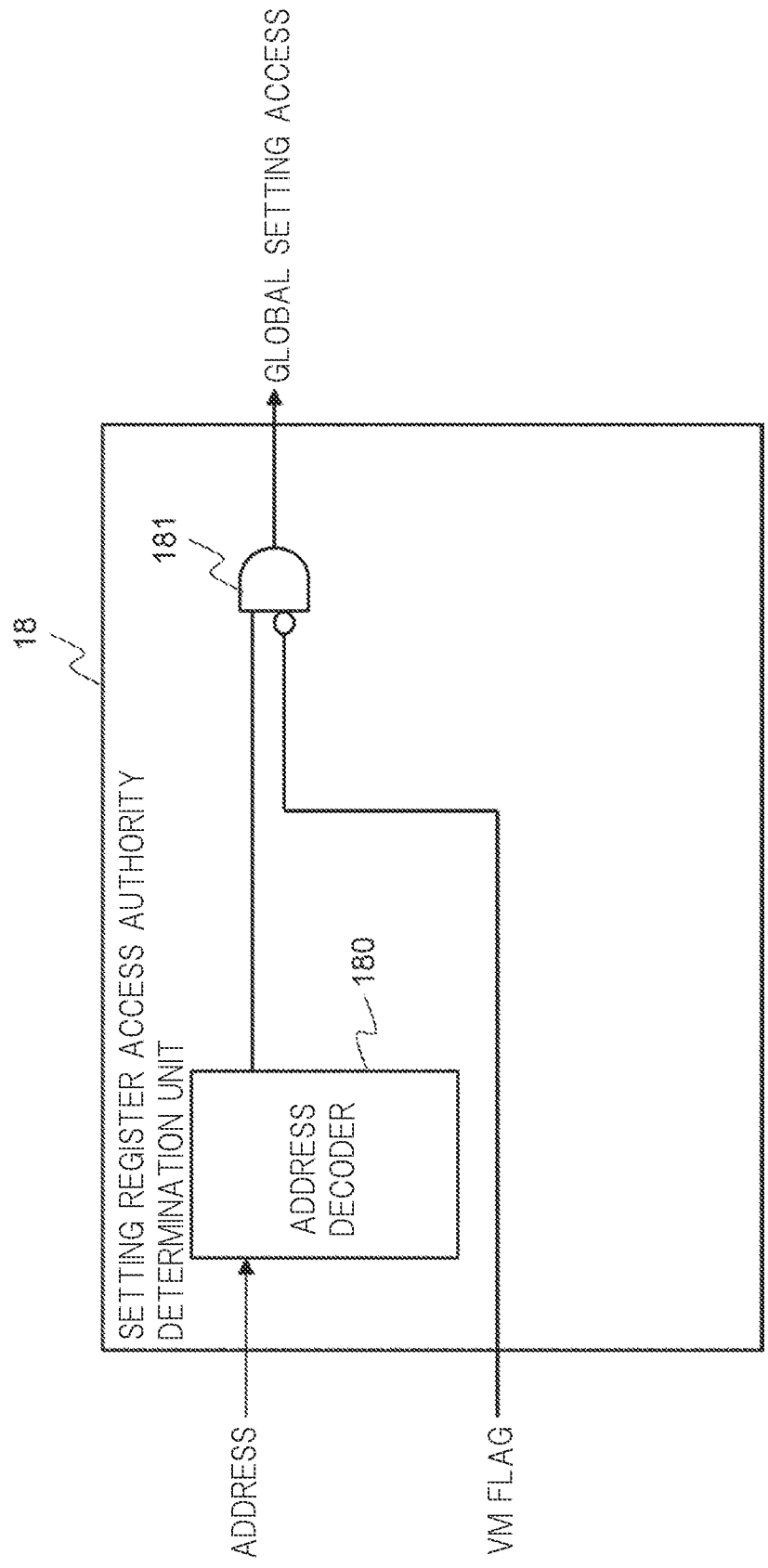
FIG. 10 is a block diagram illustrating an example of a configuration of a setting register access privilege determination unit.

FIG. 10 is a block diagram showing an example of the configuration of the setting register access authority determination unit 18. The setting register access authority determination unit 18 receives a write destination address and the VM flag from the processing circuit 11. This VM flag is also information indicating whether the writing is by the virtual machine monitor or by the virtual machine, and when the value is 1, it indicates the writing access by the virtual machine, and when the value is 0, it indicates the writing access by the virtual machine monitor.

As shown in FIG. 10, the setting register access authority determination unit 18 includes an address decoder 180 and a logical AND circuit 181.

The address decoder 180 is a circuit for determining whether or not the write destination address input from the processing circuit 11 is an access to the global setting information storage unit 13. For example, the address decoder 180 compares each address of the global setting information storage unit 13 with the address input from the processing circuit 11 to determine whether or not the access requested by the write request is an access to the global setting information storage unit 13. The address decoder 180 outputs 1 when the address of the writing destination input from the processing circuit 11 is access to the global setting information storage unit 13, or, if not, outputs 0.

The AND circuit 181 determines whether or not writing to the global setting information storage unit 13 is permitted. The output of the address decoder 180 and the VM flag are input to the AND circuit 181. The AND circuit 181 calculates the AND of the two input signals, and outputs the calculation result as a determination result of whether or not writing to the global setting information storage unit 13 is permitted. When the calculation result is 1, writing to the global setting information storage unit 13 is permitted. When the calculation result is 0, writing to the global setting information storage unit 13 is prohibited.

According to the setting register access authority determination unit 18, when a write access to the global setting information storage unit 13 occurs and the value of the VM flag is 0, that is, the access source is a virtual machine monitor, the write access to the global setting information storage unit is permitted. When a write access to the global setting information storage unit 13 occurs and the value of the VM flag is 1, that is, the access source is a virtual machine, the write access to the global setting information storage unit 13 is not permitted. That is, writing is prohibited.

The first embodiment has been described above. As described above, in the data processing apparatus 10 according to the first embodiment, it is possible to specify whether each entry 140 of the MPU entry unit 14 is the host management entry or the guest management entry based on the entry boundary information. Therefore, the final access determination unit 16 can specify whether each provisional determination result by the provisional access determination unit 15 (the memory protection authority determination unit 150) is based on the setting information of the host management entry or the setting information of the guest management entry. Therefore, even if the guest management entry and the host management entry are mixed in the MPU entry unit 14, the two types of memory protection can be appropriately realized.

That is, according to the data processing apparatus 10 of the first embodiment, the number of entries provided in the MPU entry unit 14 does not need to be the total number of entries of the maximum number necessary for the host management entry and the maximum number necessary for the guest management entry. According to the data processing apparatus 10, the ratio of the host management entry and the guest management entry can be flexibly changed by the entry boundary information. In the data processing apparatus 10, when a context of the virtual machine is switched in the host mode, the optimum memory protection state can be constructed for each virtual machine by switching the setting information of each entry 140 and changing the entry boundary information. For example, as shown in FIG. 3, a system in which four types of virtual machines (VM0, VM1, VM2, and VM3 in FIG. 3) are sequentially operated can be realized without requiring excessive hardware resources. As described above, according to the data processing apparatus 10, the memory protection function set by the virtual machine monitor and the memory protection function set by the virtual machine can be realized while suppressing an increase in the circuit scale.

The MPU entry unit 14 does not need to store the entry boundary information. That is, the setting content of the entry 140 does not depend on whether or not the memory protection according to the configuration of the present embodiment is performed. Therefore, in adopting the configuration of the present embodiment, it is possible to suppress the influence on the existing technology.

In view of the fact that the lower limit address and the upper limit address defining the address section are set in each entry 140 of the MPU entry unit 14, it can be said that the final access determination unit 16 in the present embodiment finally determines whether or not access is permitted as follows. That is, the final access determination unit 16 performs a predetermined logical operation using the first determination result and the second determination result to finally determine whether or not access is permitted. Here, the first determination result is a determination result (determination result signal "hhit") calculated from the provisional determination result of the provisional access determination unit 15 (memory protection authority determination unit 150) for the address section classified as the address section for memory protection set by the virtual machine monitor by the classification information (entry boundary information). The second determination result is a determination result (determination result signal "ghit") calculated from the provisional determination result of the provisional access determination unit 15 (memory protection authority determination unit 150) for the address section classified as the address section for memory protection set by the virtual machine by the classification information (entry boundary information).

In the present embodiment, the MPU entry unit 14 stores not only the lower limit address and the upper limit address defining the address section, but also attribute information, which is information about the attribute of the access, in association with the address section. Then, the provisional access determination unit 15 (the memory protection authority determination unit 150) provisionally determines whether or not the access request is permitted based on whether or not the address area of the access destination specified by the access request corresponds to the address section set in the entry 140 and whether or not the attribute of the access request matches the attribute information set in the entry 140. Therefore, more detailed memory protection can be realized as compared with the case where memory protection is realized only by setting the address section.

In the present embodiment, the final access determination unit 16 finally determines whether or not the access is permitted based on the classification information (entry boundary information), the provisional determination results by the provisional access determination unit 15 (memory protection authority determination unit 150), and the access source information (VM flag) indicating whether or not the access requested by the access request is an access by the virtual machine monitor. Therefore, it is possible to control whether or not to adopt the temporary determination result corresponding to the guest management entry, depending on whether or not the access source is the virtual machine monitor. Therefore, when the access source is the virtual machine monitor, access restriction according to the memory protection function set by the virtual machine can be prevented.

Second Embodiment

Figure 11:
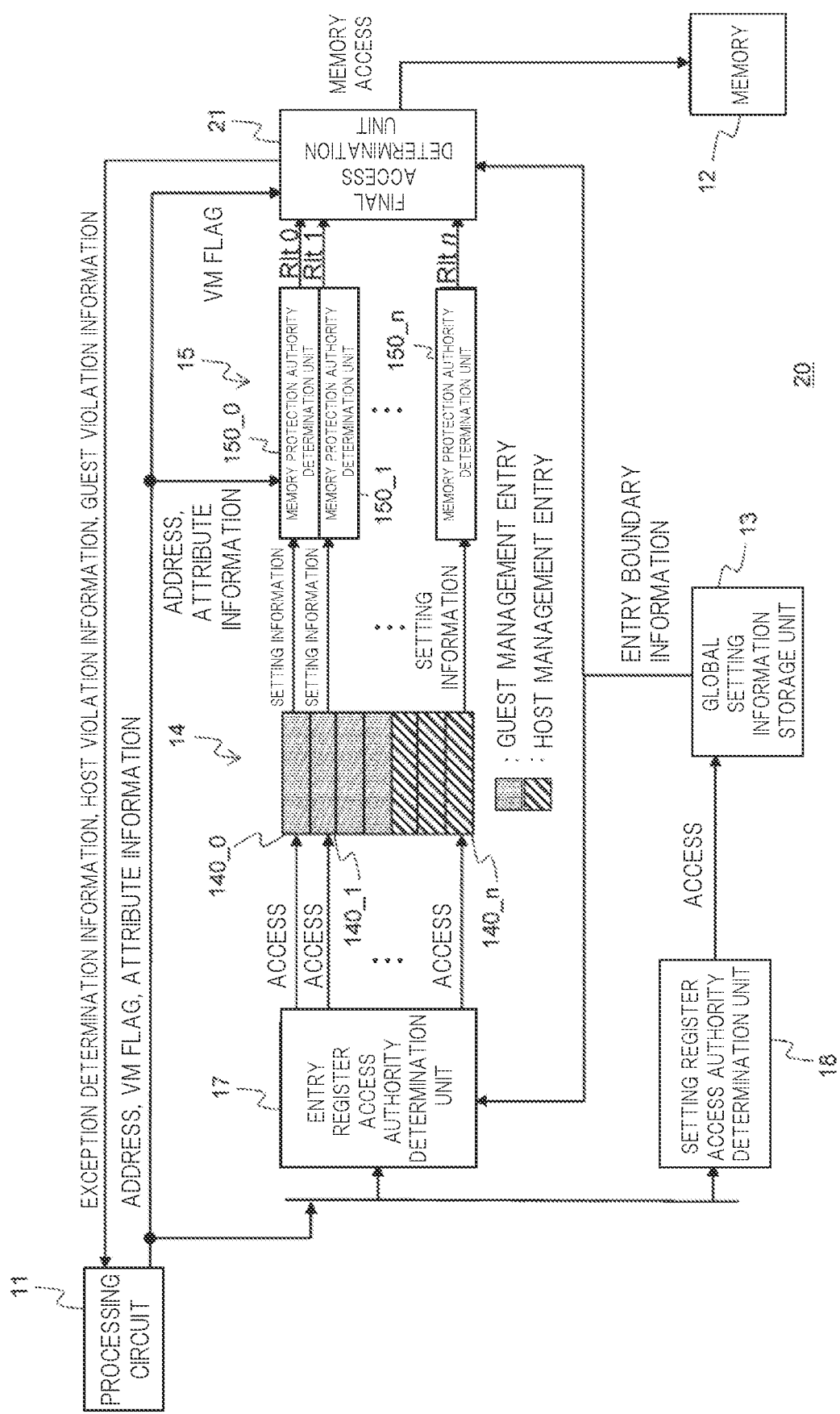
FIG. 11 is a block diagram illustrating an example of a configuration of a data processing apparatus according to the second embodiment.

FIG. 11 is a block diagram showing an example of the configuration of the data processing apparatus 20 according to the second embodiment. As shown in FIG. 11, the data processing apparatus 20 according to the second embodiment is different from the data processing apparatus 10 according to the first embodiment in that information on determination is output from the final access determination unit 21. In order to output the information on the determination, in the second embodiment, the final access determination unit 16 is replaced with the final access determination unit 21. The data processing apparatus 20 has the same configuration as that of the data processing apparatus 10 except that the final access determination unit 16 is replaced with the final access determination unit 21. In the following description, an overlapping description is omitted, and points different from the First Embodiment will be specifically described.

In the data processing apparatus 20, the final access determination unit 21 outputs exception classification information, host violation information, and guest violation information to the processing circuit 11. Here, the exception classification information is information indicating that the access request to the memory 12 by the processing circuit 11 is not finally permitted in the final access determination unit 21. The host violation information is information indicating that the access request to the memory 12 by the processing circuit 11 does not satisfy any of the conditions defined by the setting information of the host management entry. The guest violation information is information indicating that the access request to the memory 12 by the processing circuit 11 does not satisfy any of the conditions defined by the setting information of the guest management entry.

Figure 12:
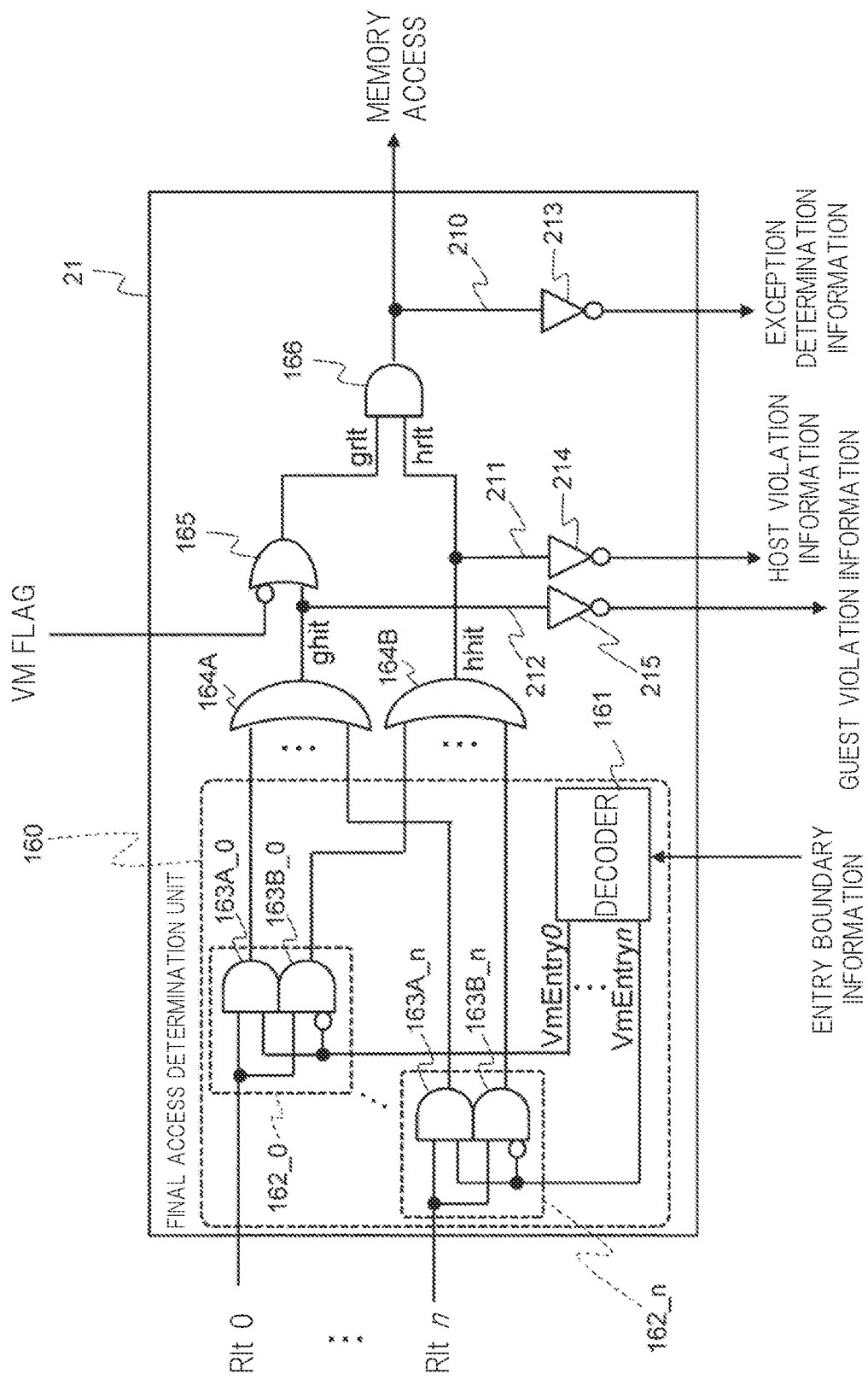
FIG. 12 is a block diagram illustrating an example of a configuration of a final access determining unit according to the second embodiment.

FIG. 12 is a block diagram showing an example of the configuration of the final access determination unit 21 according to the second embodiment. As shown in FIG. 12, the final access determination unit 21 is different from the final access determination unit 16 of the first embodiment in that a signal line 210 for outputting exception classification information, a signal line 211 for outputting host violation information, and a signal line 212 for outputting guest violation information are added.

The signal line 210 is connected to the output of the AND circuit 166. The output signal of the AND circuit 166 is inverted by an inverting circuit 213 connected to the signal line 210, and is output to the processing circuit 11 as exception classification information. When the value of the exception determination information is 1, the exception determination information indicates that the access request is not finally permitted in the final access determination unit 21.

The signal line 211 is connected to the output of the OR circuit 164B. The output signal of the OR circuit 164B is inverted by an inverting circuit 214 connected to the signal line 211, and is output to the processing circuit 11 as host violation information. When the value of the host violation information is 1, the host violation information indicates that the access request does not satisfy any of the conditions defined by the setting information of the host management entry.

The signal line 212 is connected to the output of the OR circuit 164A. The output signal of the OR circuit 164A is inverted by an inverting circuit 215 connected to the signal line 212, and is output to the processing circuit 11 as guest violation information. When the value of the guest violation information is 1, the guest violation information indicates that the access request does not satisfy any of the conditions defined by the setting information of the guest management entry.

Upon receiving the exception determination information indicating that the access request is not permitted, the processing circuit 11 performs, for example, occurrence of an exception, retention of the violation information, or notification of a violation to a safety mechanism. FIG. 13 is a table showing an example of the correspondence relationship between the host violation information and the guest violation information received by the processing circuit 11 and the violation information held by the processing circuit 11. As shown in FIG. 13, for example, when the value of the host violation information is 0 and the value of the guest violation information is 1, the processing circuit 11 records that the access request does not satisfy any of the conditions defined by the setting information of the guest management entry. That is, in this case, guest violation information is recorded. When the value of the host violation information is 1 and the value of the guest violation information is 0, the processing circuit 11 records that the access request does not satisfy any of the conditions defined by the setting information of the host management entry. That is, in this case, the host violation information is recorded. When both the values of the host violation information and the guest violation information are 1, the processing circuit 11 preferentially records that the access request does not satisfy any of the conditions defined by the setting information of the guest management entry. That is, in this case, the guest violation information is recorded preferentially. When both the values of the host violation information and the guest violation information are 0, the processing circuit 11 does not hold the violation information. In the example shown in FIG. 13, the guest violation information is recorded preferentially, but exception information may be recorded for both the guest violation information and the host violation information, or the host violation information may be recorded preferentially. The data processing apparatus 20 may include a control mechanism for setting or changing a correspondence relationship between the host violation information and the guest violation information and the violation information held by the processing circuit 11.

FIG. 14 is a table showing an example of the correspondence relationship between the host violation information and the guest violation information received by the processing circuit 11 and the machine that generates the exception. As shown in FIG. 14, for example, when the value of the host violation information is 0 and the value of the guest violation information is 1, the processing circuit 11 generates an exception in the virtual machine. When the value of the host violation information is 1 and the value of the guest violation information is 0, the processing circuit 11 generates an exception in the virtual machine monitor. When both the values of the host violation information and the guest violation information are 1, the processing circuit 11 preferentially generates an exception in the virtual machine. When both the values of the host violation information and the guest violation information are 0, the processing circuit 11 does not generate an exception. In the example shown in FIG. 14, an example is shown in which an exception is preferentially generated in the virtual machine, but an exception may be generated in both the virtual machine and the virtual machine monitor. In addition, an exception may be preferentially generated in the virtual machine monitor. That is, irrespective of which management entry condition is not satisfied, an exception may be generated in the virtual machine monitor. The data processing apparatus 20 may include a control mechanism for setting or changing the correspondence relationship between the host violation information and the guest violation information received by the processing circuit 11 and the machine that generates the exception.

As described above, in the data processing apparatus 20 according to the second embodiment, information on the determination is notified from the final access determination unit 21 to the processing circuit 11. Therefore, when access is not permitted, the processing circuit 11 can perform various controls such as occurrence of an exception and recording of an exception. Therefore, when access is not permitted, the system can be appropriately controlled.

In addition, the processing circuit 11 can control a machine for processing an exception or a priority order of exception processing based on the information notified from the final access determination unit 21. For example, as described above, when both the values of the host violation information and the guest violation information are 1, the access error according to the setting of the guest management entry can be recorded, and the exception occurrence machine can be the virtual machine. In this case, it is possible to configure a system in which an exception caused by a low-reliability task in a virtual machine (for example, application software running on the virtual machine) is first handled by a high-reliability task in the virtual machine (for example, an OS running on the virtual machine).

It should be noted that a switch for fixing the exception occurrence machine to the virtual machine monitor may be prepared, and exception processing may be performed only by the virtual machine monitor. In the above description, the final access determination unit 21 outputs three pieces of information, i.e., the exception determination information, the host violation information, and the guest violation information, but one or two pieces of information may be output. That is, the final access determination unit 21 may notify the processing circuit 11 of the first determination result (output of the OR circuit 164A), the second determination result (output of the OR circuit 164B), or the final determination result.

Third Embodiment

When the virtual machine monitor switches the virtual machine to be operated, or when the virtual machine switches the application software to be executed, it is necessary to switch the setting information of each entry 140 of the MPU entry unit 14. The switching of the setting information of each entry 140 is performed by saving the setting information to the memory 12 and restoring the setting information from the memory 12. This embodiment is different from the above embodiment in that a sequencer for saving and restoring the setting information is provided in the processing circuit.

Figure 15:
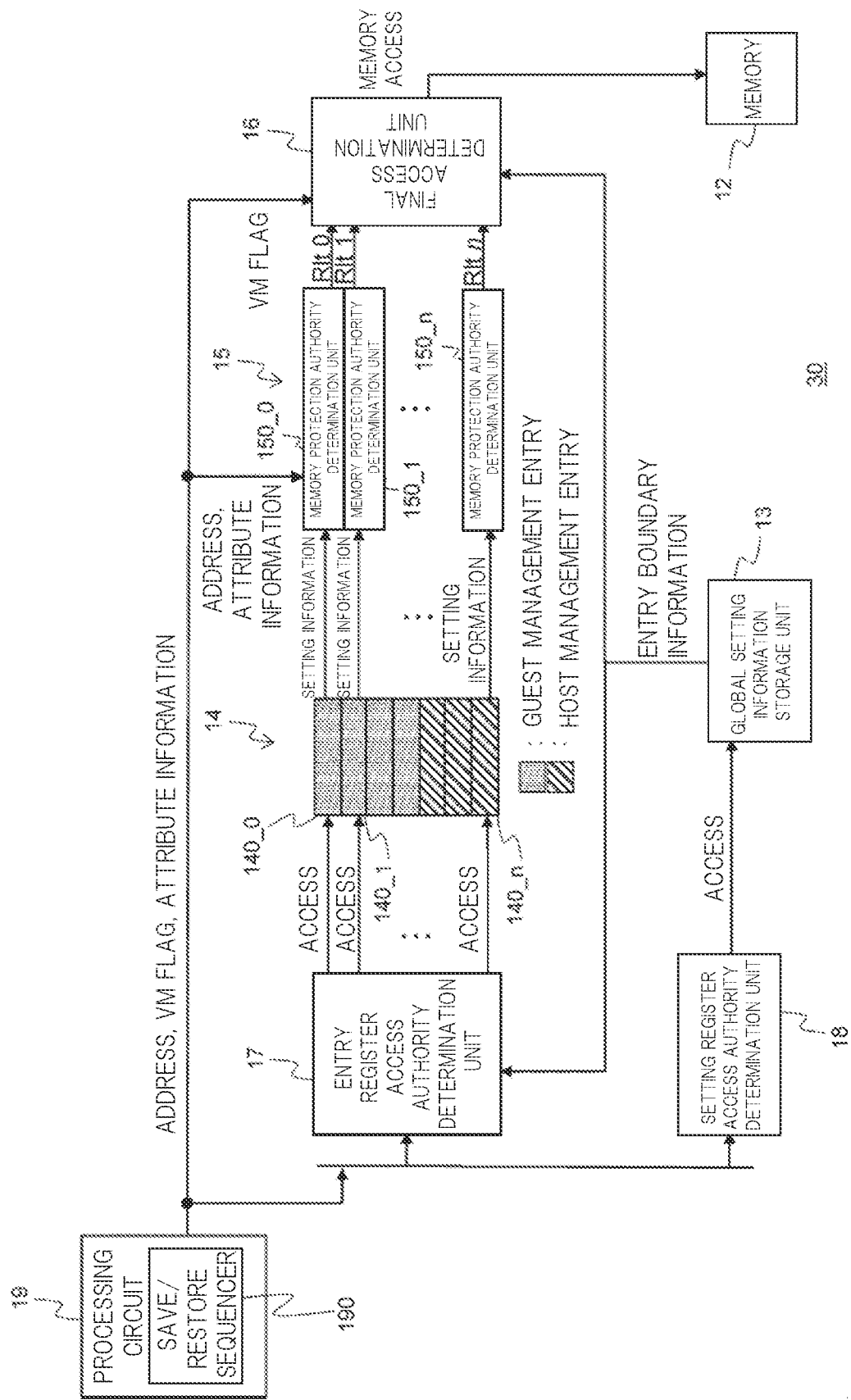
FIG. 15 is a block diagram illustrating an example of a configuration of a data processing apparatus according to the third embodiment.

FIG. 15 is a block diagram showing an example of the configuration of the data processing apparatus 30 according to the third embodiment. As shown in FIG. 15, the data processing apparatus 30 according to the third embodiment is different from the data processing apparatus 10 according to the first embodiment in that the processing circuit 11 is replaced with a processing circuit 19 including a saving/restoring sequencer 190. In the following description, an overlapping description is omitted, and points different from the First Embodiment will be specifically described.

The save/restore sequencer 190 is a control circuit that saves all or part of the setting information stored in each entry 140 of the MPU entry unit 14 to the memory 12, and restores all or part of the setting information from the memory 12 to each entry 140. The save/restore sequencer 190 moves the setting information stored in the address range specified by the virtual machine monitor or the virtual machine between the MPU entry unit 14 and the memory 12.

Figure 16:
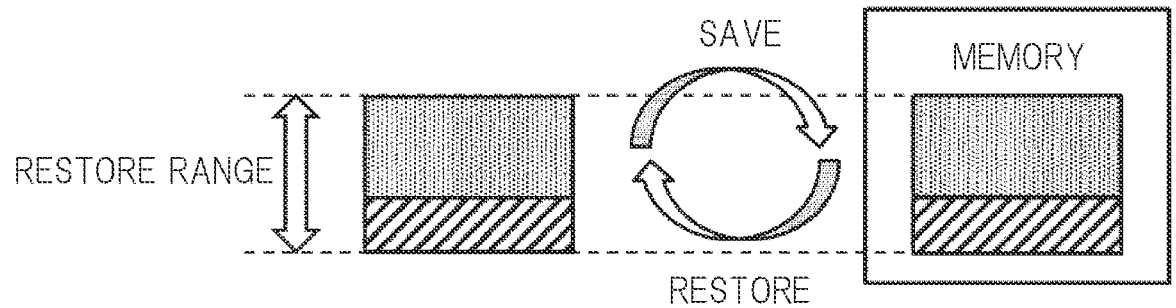
FIG. 16 is a schematic diagram illustrating a switching of setting information performed by an instruction of a virtual machine monitor.

In the switching of the setting information performed by the instruction of the virtual machine monitor, for example, as shown in FIG. 16, the setting information of the entry 140 including the host management entry and the guest management entry is saved in the memory 12, and the new setting information is returned from the memory 12 to the entry 140 including the host management entry and the guest management entry. Therefore, when the setting information is switched by the instruction of the virtual machine monitor, the return of the setting information from the memory 12 to the MPU entry unit 14 is allowed for all the entries 140.

Figure 17:
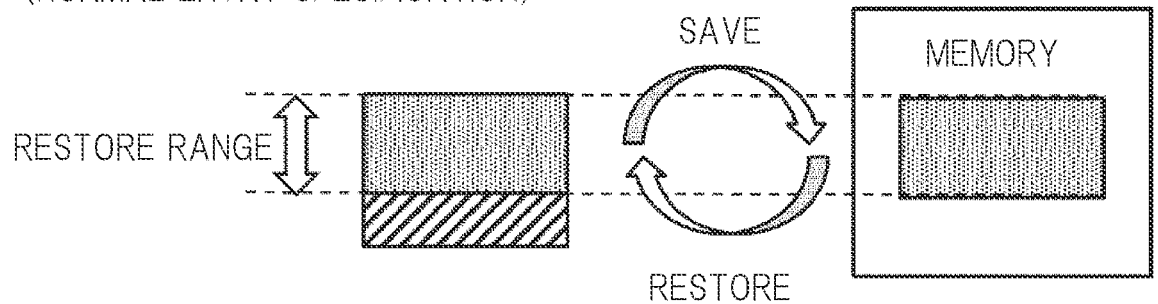
FIG. 17 is a schematic diagram illustrating a switching of setting information performed by appropriate instructions of a virtual machine.
Figure 18:
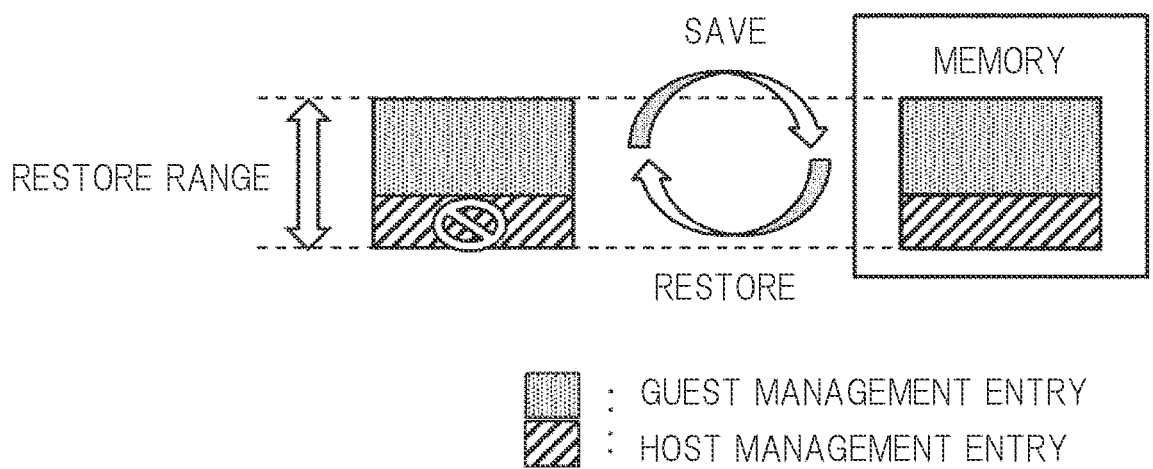
FIG. 18 is a schematic diagram illustrating a switching of setting information performed by improper instructions on a virtual machine.

On the other hand, in the switching of the setting information performed by the instruction of the virtual machine, it is necessary to allow the switching of only the guest management entry and limit the switching of the host management entry. That is, although the return to only the guest management entry as shown in FIG. 17 is allowed, the return to the host management entry as shown in FIG. 18 needs to be prohibited. Therefore, the save/restore sequencer 190 has the same control mechanism as the above-described entry register access authority determination unit 17, and controls the return of the setting information from the memory 12 to the entry 140 based on the address specifying the write target in the storage area of the MPU entry unit 14, the entry boundary information, and the VM flag. Specifically, the save/restore sequencer 190 prohibits the return of the setting information to the entry 140 when the entry 140 of return destination (write target) is determined to include the host management entry based on the entry boundary information and the address specifying the write target and the value of the VM flag is 1.

As described above, the data processing apparatus 30 includes the saving/restoring sequencer 190 for saving information stored in the MPU entry unit 14 to the memory 12 and restoring information saved in the memory 12 to the MPU entry unit 14. As described above, in the present embodiment, since there is dedicated hardware for switching the MPU entry unit 14, it is expected that the switching processing is completed at a higher speed than in the case where the switching is executed by software processing. In addition, since the same control as that of the entry register access authority determination unit 17 is performed at the time of switching the contents of the entry 140, it is possible to prohibit the virtual machine from improperly writing to the host management entry.

Fourth Embodiment

In the first embodiment, the access to the memory 12 is prohibited by default. Therefore, in the first embodiment, the entry 140 stores a lower limit address and an upper limit address which define an address section in which access can be permitted. Fourth Embodiment shows an embodiment in which access to the memory 12 is permitted by default. That is, a configuration example in which a lower limit address and an upper limit address that define an address section in which access is prohibited are stored as setting information in each entry 140 will be described.

The data processing apparatus according to the fourth embodiment is the same as the data processing apparatus 10 according to the first embodiment except that the final access determination unit 16 is replaced with the final access determination unit 31. In the following description, an overlapping description is omitted, and points different from First Embodiment will be specifically described.

Figure 19:
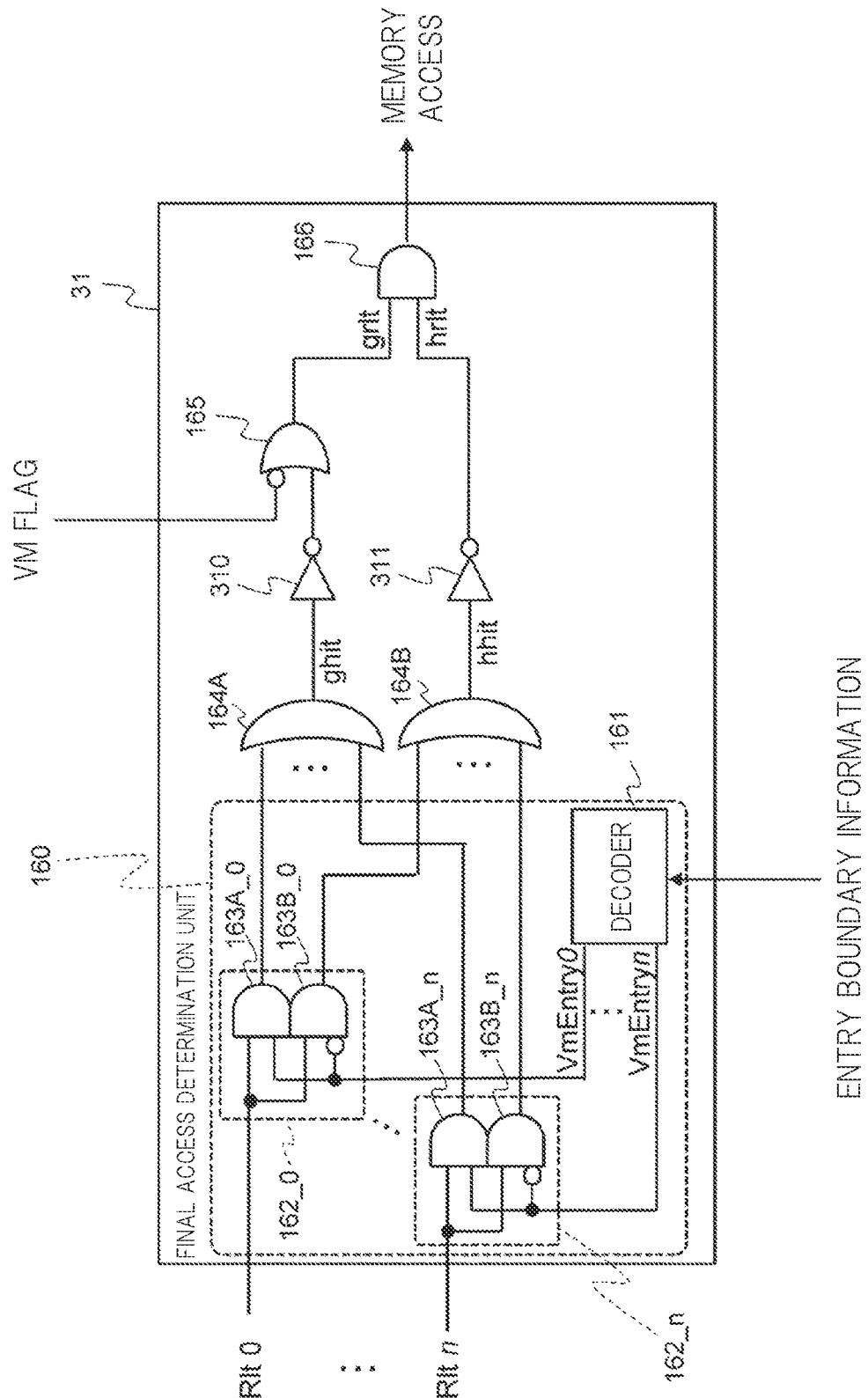
FIG. 19 is a block diagram illustrating an example of the configuration of the final access determining unit according to the fourth embodiment.

FIG. 19 is a block diagram showing an example of the configuration of the final access determination unit 31 according to the fourth embodiment. As illustrated in FIG. 19, the final access determining section 31 differs from the final access determining section 16 in that it has inverting circuits (NOT circuits) 310 and 311.

The inverting circuit 310 is provided between the OR circuit 164A and the OR circuit 165, and inverts the determination result signal "ghit" outputted from the OR circuit 164A and inputs the inverted signal to the OR circuit 165. The inverting circuit 311 is provided between the OR circuit 164B and the AND circuit 166, and inverts the determination result signal "hhit" outputted from the OR circuit 164B and inputs the inverted signal to the AND circuit 166.

The determination result signal "ghit" is a signal having a value of 1 when the access request from the processor 11 satisfies the condition defined by the setting information of one of the guest management entries. The determination result signal "hhit" is a signal having a value of 1 when the access request from the processor 11 satisfies the condition defined by the setting information of any of the host management entries. In the present embodiment, the guest management entry and the host management entry store, as setting information, a lower limit address and an upper limit address which define an address section in which access is prohibited. Therefore, when the value of the determination result signal "ghit" is 1, it means that the condition for prohibiting accesses is satisfied. Therefore, in the present embodiment, as described above, the inversion circuit 310 inverts the determination result signal "ghit" so that the signal input to the OR circuit 165 becomes a signal equivalent to the signal input to the OR circuit 165 in the final access determination unit 16 according to the first embodiment. Similarly, by inverting the determination result signal "hhit" in the inverting circuit 311, the signal input to the AND circuit 166 becomes a signal equivalent to the signal input to the AND circuit 166 in the final access determining unit 16 according to the first embodiment.

As described above, also in the present embodiment, the signal input to the OR circuit 165 and the signal input to the AND circuit 166 are the same as those in the first embodiment. Therefore, the OR circuit 165 and the AND circuit 166 can realize the same access control as that in the first embodiment.

As described above, the address section represented by the setting information stored in the MPU entry unit 14 may indicate an address section in which access can be permitted, or may indicate an address section in which access is prohibited. As in the first embodiment, when an address section in which access can be permitted is set, the memory protection function set by the virtual machine monitor and the memory protection function set by the virtual machine can be realized while suppressing an increase in the circuit scale in a system in which access to the memory 12 is prohibited by default. In addition, as in the fourth embodiment, when an address section in which access is prohibited is set, the memory protection function set by the virtual machine monitor and the memory protection function set by the virtual machine can be realized while suppressing an increase in the circuit scale in a system in which access to the memory 12 is permitted by default.

In all the embodiments described above, each element described in the drawings as a functional block for performing various processes can be configured by a CPU, a memory, and other circuits in hardware, and is realized by a program loaded into the memory in software. Therefore, it is understood by those skilled in the art that these functional blocks can be realized in various forms by hardware alone, software alone, or a combination thereof, and the present invention is not limited to any of them.

The program may also be stored and provided to the computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory, a CD-R, a CD-R/W, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

Although the invention made by the inventor has been specifically described based on the embodiments, the present invention is not limited to the embodiments already described, and it is needless to say that various modifications can be made without departing from the gist thereof. For example, Second Embodiment and Third Embodiment may be combined. Either or both of the features of Second Embodiment and Third Embodiment may be applied to Fourth Embodiment.

What is claimed is:

1. A data processing apparatus comprising:
   N (N is an integer) number of first registers each of which stores setting information for memory protection;
   a second register storing a border information which defines an M-th (M is an integer) register of the first registers; and
   a determination circuit which determines whether an access request is permitted based on the first registers and the second register,
   wherein each of the (first to (M−1)-th) first registers stores setting information for memory protection set by a virtual machine and each of the (M-th to N-th) first registers stores setting information for memory protection set by a virtual machine monitor, and
   wherein the determination circuit determines that an access request from the virtual machine is permitted when both one of the (first to (M−1)-th) first registers and one of the (M-th to N-th) first registers include an address as the setting information for memory protection corresponding to an address destination of the access request from the virtual machine.

2. The data processing apparatus according to claim 1, wherein the determination circuit determines that an access request from the virtual machine monitor is permitted when one of the (M-th to N-th) first registers includes an address as the setting information for memory protection corresponding to an address destination of the access request from the virtual machine monitor.

3. The data processing apparatus according to claim 1,
   wherein the setting information for memory protection further includes attribute information, and
   wherein the determination circuit determines that an access request from the virtual machine is permitted when both one of the (first to (M−1)-th) first registers and one of the (M-th to N-th) first registers include an address and attribute information as the setting information for memory protection corresponding to an address destination and an attribute information of the access request from the virtual machine.

4. The data processing apparatus according to claim 1, further comprising a memory protection setting writing control circuit that controls writing to the first and second registers based on an address specifying the first and second registers, and write source information indicating that the writing is performed by the virtual machine monitor.

5. The data processing apparatus according to claim 1, wherein the determination circuit notifies a source of the access request of a determination result.

6. The data processing apparatus according to claim 1, wherein the setting information for memory protection indicates an address range in which an access request is permitted.

7. The data processing apparatus according to claim 1,
wherein the setting information for memory protection is saved to a memory by a save request from the virtual machine monitor or the virtual machine,
wherein the saved setting information for memory protection is restored by a restore request from the virtual machine monitor, and
wherein the saved setting information for memory protection set by a virtual machine among the saved setting information for memory protection is restored by a restore request from the virtual machine.

\* \* \* \* \*